US006604038B1

(12) United States Patent
Lesesky et al.

(10) Patent No.: US 6,604,038 B1
(45) Date of Patent: Aug. 5, 2003

(54) APPARATUS, METHOD, AND COMPUTER PROGRAM PRODUCT FOR ESTABLISHING A REMOTE DATA LINK WITH A VEHICLE WITH MINIMAL DATA TRANSMISSION DELAY

(75) Inventors: Alan C. Lesesky, Charlotte, NC (US); Bobby Ray Weant, Rock Hill, SC (US)

(73) Assignee: Power Talk, Inc., Rock Hill, SC (US)

( * ) Notice: Subject to any disclaimer, the term of this patent is extended or adjusted under 35 U.S.C. 154(b) by 0 days.

(21) Appl. No.: 09/435,931

(22) Filed: Nov. 9, 1999

(51) Int. Cl.$^7$ .......................... G08G 1/04; G06F 13/37; G06F 13/00
(52) U.S. Cl. ........................... 701/49; 701/34; 340/988
(58) Field of Search ..................... 701/49, 34; 340/988; 710/100, 105; 327/153; 713/400, 401; 370/452, 476, 451, 475

(56) References Cited

U.S. PATENT DOCUMENTS

| 2,379,664 A | 7/1945 | Stanko | 336/90 |
| 2,483,815 A | 10/1949 | Easton | 336/90 |

(List continued on next page.)

FOREIGN PATENT DOCUMENTS

| EP | 0546370 A1 | 6/1993 |
| EP | 0 744 322 A2 | 11/1996 |

(List continued on next page.)

OTHER PUBLICATIONS

Sales Brochure for Intellon Spread Spectrum Carrier, *Where the information highway meets the intelligent building Intellon's Spread Spectrum Carrier™ technology will be directing traffic.*

(List continued on next page.)

*Primary Examiner*—Tan Q. Nguyen
*Assistant Examiner*—Dalena Tran
(74) *Attorney, Agent, or Firm*—Moore & Van Allan PLLC; Michael G. Johnston

(57) ABSTRACT

The present invention provides several apparatus, methods, and computer program products for establishing a data communication link between an interrogation device and the data bus of a vehicle. Specifically, in one embodiment, the present invention provides apparatus, methods, and computer program products that process data transmitted to and from the data bus of a vehicle one bit at a time with minimal delay. The apparatus, methods, and computer program products of this embodiment also prevent propagation of false data to both the data bus and the interrogation device, which is generated by the transmission of data to and from the data bus. The present invention also provides apparatus and methods that reduce the introduction of false data in the form of signal noise onto the data bus of a vehicle when the data bus is not transmitting data to or receiving data from a remote location. In this embodiment, the present invention includes a switch, that in the open position isolates the data bus from a transceiver used to receive external data. The present invention also provides apparatus and methods that establish data communication links between interrogation devices and the data bus of a vehicle by transmitting a data link command alerting the data bus that the interrogation device is attempting to form a data communication link. In some embodiments, both the vehicle and remote interrogation device transmit a heartbeat signal to each other over a data communication link to signify that a data communication link is present. When the heartbeats signal is not received, the vehicle and interrogation device determine that the data link has ended.

30 Claims, 14 Drawing Sheets

U.S. PATENT DOCUMENTS

| | | | |
|---|---|---|---|
| 3,154,360 A | 10/1964 | Plishner | 439/335 |
| 3,184,703 A | 5/1965 | Piscitello et al. | 439/335 |
| 3,387,606 A | 6/1968 | Crafts et al. | 128/202.27 |
| 3,705,986 A | 12/1972 | Sanders et al. | 359/158 |
| 4,041,470 A | 8/1977 | Slane et al. | 701/35 |
| 4,104,630 A | 8/1978 | Chasek | 342/44 |
| 4,287,505 A | 9/1981 | Ohmori et al. | 340/453 |
| 4,313,228 A | 1/1982 | Berstein | 359/144 |
| 4,325,146 A | 4/1982 | Lennington | 359/155 |
| 4,398,172 A | 8/1983 | Carroll et al. | 340/942 |
| 4,506,386 A | 3/1985 | Ichikawa et al. | 455/343 |
| 4,573,207 A * | 2/1986 | Smith et al. | 455/54 |
| 4,624,472 A | 11/1986 | Stuart et al. | 280/420 |
| 4,641,322 A | 2/1987 | Hasegawa | 375/145 |
| 4,715,012 A | 12/1987 | Mueller, Jr. | 701/50 |
| 4,733,919 A | 3/1988 | Jacobs et al. | 303/28 |
| 4,735,461 A | 4/1988 | Moller et al. | 303/7 |
| 4,752,899 A | 6/1988 | Newman et al. | 702/188 |
| 4,767,181 A | 8/1988 | McEowen | 385/78 |
| 4,772,209 A | 9/1988 | Muncey | 439/36 |
| 4,804,938 A | 2/1989 | Rouse et al. | 340/310.06 |
| 4,809,177 A | 2/1989 | Windle et al. | 701/1 |
| 4,838,797 A | 6/1989 | Dodier | 439/38 |
| 4,839,531 A | 6/1989 | Stemmons et al. | 307/17 |
| 4,864,589 A | 9/1989 | Endo | 375/141 |
| 4,897,642 A | 1/1990 | DiLullo et al. | 340/10.41 |
| 4,926,158 A * | 5/1990 | Zeigler | 340/310 A |
| 4,926,170 A | 5/1990 | Beggs et al. | 340/904 |
| 4,952,908 A | 8/1990 | Sanner | 340/429 |
| 4,969,839 A | 11/1990 | Nilsson | 439/395 |
| 4,996,719 A | 2/1991 | Okazaki et al. | 359/144 |
| 5,025,253 A | 6/1991 | DiLullo et al. | 340/10.41 |
| 5,081,667 A | 1/1992 | Drori et al. | 379/59 |
| 5,090,024 A | 2/1992 | Vander Mey et al. | 375/139 |
| 5,142,278 A | 8/1992 | Moallemi et al. | 340/436 |
| 5,263,046 A | 11/1993 | Vander Mey | 375/139 |
| 5,268,666 A | 12/1993 | Michel et al. | 340/310.06 |
| 5,278,862 A | 1/1994 | Vander Mey | 375/139 |
| 5,359,625 A | 10/1994 | Vander Mey et al. | 375/142 |
| 5,385,476 A | 1/1995 | Jasper | 439/38 |
| 5,397,924 A | 3/1995 | Gee et al. | 307/9.1 |
| 5,442,810 A | 8/1995 | Jenquin | 455/66 |
| 5,446,470 A | 8/1995 | Avignon et al. | 343/713 |
| 5,488,352 A | 1/1996 | Jasper | 340/431 |
| 5,570,087 A | 10/1996 | Lemelson | 340/870.05 |
| 5,586,118 A * | 12/1996 | Hashimoto et al. | 370/451 |
| 5,677,667 A | 10/1997 | Lesesky et al. | 340/431 |
| 5,732,074 A | 3/1998 | Spaur et al. | 370/313 |
| 5,739,592 A | 4/1998 | Rigsby et al. | 307/9.1 |
| 5,764,919 A * | 6/1998 | Hashimoto | 395/200.66 |
| 5,783,993 A | 7/1998 | Briski et al. | 340/525 |
| 5,790,536 A | 8/1998 | Mahany et al. | 370/338 |
| 5,794,164 A | 8/1998 | Beckert et al. | 701/1 |
| 5,802,545 A | 9/1998 | Coverdill | 711/35 |
| 5,852,405 A | 12/1998 | Yoneda et al. | 340/825.02 |
| 5,892,927 A * | 4/1999 | Boehmer et al. | 395/280 |
| 5,900,803 A | 5/1999 | Politz et al. | 340/425.5 |
| 6,028,537 A * | 2/2000 | Suman et al. | 340/988 |

FOREIGN PATENT DOCUMENTS

| | | |
|---|---|---|
| EP | 0 802 082 A | 10/1997 |
| JP | 52-33092 | 3/1977 |
| JP | 02 079502 A | 3/1990 |
| WO | WO 93/22848 | 11/1993 |
| WO | WO94/12962 | 6/1994 |
| WO | WO97/17232 | 5/1997 |
| WO | WO 97/17232 | 5/1997 |
| WO | WO 97/28988 A1 | 8/1997 |
| WO | WO 98/34812 A3 | 8/1998 |
| WO | WO 98/37432 A1 | 8/1998 |
| WO | WO 99/06987 A2 | 2/1999 |
| WO | WO 99/21383 | 4/1999 |
| WO | WO 99/35009 A1 | 7/1999 |

OTHER PUBLICATIONS

*Spread Spectrum Systems, Telecommunications Engineer's Reference Book*, published 1993.

Echelon's LonWorks™ Custom Node Development, LonWorks Engineering Bulletin, Apr. 1993.

Sayegrih, et al., *Data Transmission Within Vehicles, the Spread Spectrum Technique, L'Onde Electrique*, May–Jun. 1993.

*Surface Vehicle Standard SAE J560 Specification, Society of Automotive Engineers, Inc.*, Jun. 1993.

*Serial Data Communications Between Microcomputer Systems in Heavy–Duty Vehicle Applications SAE J1708, Society of Automotive Engineers, Inc.*, Jan. 1986, last revised Oct. 1993.

PCT International Search Report, PCT/US96/16580, Mar. 13, 1997.

*System 86 Products Train Applications, Specification Manual, The 95–96 Echelon LonWorks Products Databook*, Morrison Knudsen Corporation Advanced Systems Division, pp. 2, 3, 13, 40.

*Data Communications Special Report, IEEE Spectrum*, vol. 31, No. 6, pp. 49–55, Jun. 1994.

Echelon's LonWorks Products Data Book, 1995–1996 Edition.

Von Wolfgang Bode and Bruno Morandi, *MaterialfluB per Infrarot* (Eng. Materials Handling by Infrared), Technische Rundschau, vol. 82, No. 21, pp. 74–79, and 81 (May 25, 1990) Hallwag Verlag, Bern, Switzerland, (p. 74, RH col., bottom to p. 77, LH column, top).

\* cited by examiner

APPARATUS, METHOD, AND COMPUTER PROGRAM PRODUCT FOR ESTABLISHING A REMOTE DATA LINK WITH A VEHICLE WITH MINIMAL DATA TRANSMISSION DELAY

FIELD OF THE INVENTION

The present invention relates generally to data communication and more particularly to establishing a wireless data communication link between the data bus of a vehicle and a remote interrogation device.

BACKGROUND OF THE INVENTION

Many of today's vehicles are equipped with sophisticated computer systems. These computer systems typically include a central computer that receives data from sensors located throughout the vehicle. The sensors record data information concerning systems of the vehicle, and the central computer system uses this information to control the operation of the vehicle, store the data for historical purposes, and/or analyze the data for diagnostic purposes. For example, many vehicles include central computer systems that receive data from sensors such as throttle sensors, oxygen sensors, and fuel flow sensors to regulate the engine.

In addition to providing data for operation of the vehicle, many vehicle computer systems include sensors that provide data concerning the various systems of the vehicle for use in diagnostic and maintenance operations. For example, many heavy duty vehicles now include sensors that provide data relating to safety systems, such as the status of the brakes of the vehicle. Additionally, many systems provide logistics data relating to the vehicle, such as mileage, fuel tank levels, gas mileage, status of contents hauled in the vehicle, etc.

To access data from the computer system, many of today's vehicles include electrical pin-out connectors that are accessible for connection. In these systems, a diagnostic device may be connected to the pin-out connector to receive and transmit data to and from the onboard computer of the vehicle. In light of this, several interrogation devices have been developed in the past few years that interface with the pin-out connector of a vehicle and transmit and receive data relating to the operation of the vehicle and status of its various systems. Although these conventional systems are effective for receiving data from and transmitting data to the data bus of the vehicle, these interrogation devices require physical connection to the vehicle, which may not be desirable in situations where the vehicle is either in transit or is remote from the interrogation device requesting data input.

Although remote, wireless communication with the computer system of a vehicle is typically desired, the physical limitations of the communication infrastructure of most vehicles hinder the move to wireless communication. For instance, the communication systems of many conventional vehicles, such as heavy duty vehicles (e.g., tractor-trailer vehicles) use a communication protocol that requires real-time communication with the vehicle. Specifically, many heavy duty vehicles include a data bus that is operated using one of two bus standards, either J1708 or J1939. Communication on the data bus of these vehicles may be problematic due to the nature of the J1708 and J1939 standards. For example, a data bus that uses the J1708 standard is a differentially driven, twisted pair. The data bus of this system is half duplexed such that data transmitted on the data bus is transmitted on both of the twisted pair of wires, where data transmitted on one of the twisted pair of wires is mirrored with respect to the other twisted pair wire. Because data transmitted on the bus is transmitted on both wires of the bus, the data bus does not have a transmit and receive line. Further, systems attempting to transmit data on the data bus must monitor the data bus for an idle state when data is not transmitted, before the system transmits data on the data bus.

As discussed, many conventional interrogation devices have been developed for use in direct electrical communication with the data bus of a vehicle. These systems, to some extent, do not experience problems with the infrastructure or protocol of the data bus, because they are in direct electrical connection with the data bus. This direct electrical connection allows these systems to monitor the idle states of the data bus in real-time. For this reason, in the past few years several interrogation devices have been developed for transmitting and receiving data from the data bus of a vehicle using direct electrical communication with the data bus. Importantly, these interrogation devices typically use software programs that are specifically designed to interface with the data bus in real-time. The software programs monitor the bus for idle states and transmit data to the bus.

Due to the limitations of direct physical connection with the vehicle, however, there has been a desire to retrofit these existing systems with front end wireless communication add-on systems such that the existing interrogation devices may be remotely located away from the vehicle. For instance, many of these systems are now retrofitted with RF based communication systems that communicate with the vehicle remotely. Although these conventional systems provide wireless communication, the retrofit of an existing interrogation device may be costly.

Specifically, because these retrofitted systems communicate with the vehicle remotely, instead of a direct electrical connection, there is some delay due to processing of the data and transmission of the data. Because of these delays, most of these systems can no longer provide a real-time data link with the data bus of the vehicle. Instead, most retrofitted systems use data buffers that buffer data transmitted to and data received from the data bus of the vehicle. The buffered data is held until the data bus has an idle state, at which time the data is applied to the data bus. This buffering of data presents a problem, however, with retrofitting existing interrogation devices.

Specifically, most of these interrogation systems, prior to retrofit, have computer software designed for real-time communication with the data bus. As such, as part of the retrofit process, the original software for operating the interrogation system must be updated or otherwise reprogrammed to accommodate for the delay due to buffering of data. The reprogramming or updating of these programs can be costly. For instance, third party contractors, who may no longer be available for updating the software, may have created many of the programs. Further, the software may have been written using older software programming languages. In some instances, the software may have to be totally reprogrammed. As such, solutions are needed that allow for remote, wireless communication with the data bus of vehicles that is either real-time or approximately real-time, such that the software of the interrogation device and the data bus communicate in approximate real-time and the software of the interrogation device does not have to be altered.

One problem with providing remote, approximate real-time data communication is the data bus infrastructure and protocol and the data communication devices themselves. This data bus infrastructure and protocol is one reason existing systems buffer data. With reference to FIG. 1, some of the problems associated with wireless communication with the data bus of a vehicle are illustrated. Specifically, FIG. 1 shows a transceiver 10 for transmitting to and receiving data from a remote location to be applied to the data bus of a vehicle. The transceiver includes both a transmitter 12 and a receiver 14 connected to the data bus 16 of a vehicle. In this illustration, the data bus uses J1708 protocol and is a differentially driven, twisted pair. As discussed previously, the data bus does not include a read and write data communication line. Instead, both the transmitter and the receiver of the transceiver are commonly connected to the bus at a node 17. This common connection causes problems when data is transmitted from the receiver of the transceiver to the data bus.

Specifically, when the receiver 14 of the transceiver receives data 18, the data 18 is applied to the data bus 16. Because of the common connection at the node 17, the data 18 is also applied to the transmitter line of the transmitter 12. As such, as data is applied to the data bus, it is also transmitted by the transceiver. This is first problematic because the data transmitted by the transceiver, which is referred to herein as either looped or false data 19, is transmitted to a remote interrogation device and is basically bad data. Secondly, as the transmitter 12 transmits the data, the receiver 14 of the transceiver also receives the false data 19. Left unchecked, this looped or false data 19 will potentially corrupt not only the remote interrogation device but also the data bus.

Because of the infrastructure and protocol of the data bus and problems associated with transceivers receiving what they transmit, these problems must be addressed as part of signal processing when data is transmitted to and received from a remote location in a wireless format. Because of this data processing problem, many conventional add on wireless systems buffer the data, because they cannot process the data without significant delays. As discussed, however, buffering of the data in many instances requires reconfiguring existing software of interrogation devices, which can be costly. As such, communication systems are needed that alleviate the problems with looped or false data without requiring added delay, such that data may be transmitted to and from the data bus of the vehicle in an approximate real-time manner.

In addition to problems associated with the delays in remote, wireless data communication with the data bus of a vehicle, there are also particular problems associated with the limited transmitting and receiving range of most transceivers. As discussed, some vehicles, such as heavy duty vehicles, use data bus infrastructures and protocol that require interrogation devices to wait for an idle state on the bus prior to transmitting information to the data bus. A problem is presented when a transceiver is connected to the data bus of the vehicle for receiving external signals such as RF or IR signals. Specifically, when not in use for data communication, the transceiver may receive spurious noise signals from various sources that may be input on the data bus as false data and corrupt data on the data bus. For example, in the case of IR transceivers, light from the headlights of other vehicles or sunlight may be received by the transceiver and applied to the data bus as false data. Similarly, in the case of RF transceivers, spurious RF signals from many sources such as radios, cell phones, etc. may received as false data on the data bus. As such, a communication system is needed that isolates the data bus from remote data input when a remote data communication link is not established with the data bus.

An additional problem with wireless, remote data communication may be caused by the transmission and reception ranges of the interrogation devices. For example, in instances in which the interrogation device uses RF communication, there is a limited coverage area within which the interrogation device may receive and transmit data. A similar problem may be experienced in instances where IR communication is used. Specifically, most transceivers have limited transmission and reception ranges, such that vehicles outside the range may receive either intermittent or corrupted data signals. In these instances, it is typically not advantageous to establish a data communication link with a vehicle that is either outside or on the fringe of the transmitting and receiving range of the transceiver.

Problems may also be realized where there are several vehicles in an area with which a remote interrogation device wishes to establish a data communication link. For instance, if the interrogation device is used in a garage or shipyard setting, the user of the interrogation device may wish to communicate with either a particular vehicle or several of the vehicles one at a time. Similarly, in a factory setting, the user of the interrogation device may wish to correspond with vehicles one at a time, as they move past the interrogation device. Problems may occur, however, where two or more of the vehicles attempt to establish a data communication link with the interrogation device at the same time. As such, systems are needed that accommodate for the transmission and reception limitations of the transceivers. Additionally, systems are needed that provide for establishing a data link with one vehicle in an environment where several vehicles are present.

A still further problem is the time required for data communication between the data bus of a vehicle and a remote interrogation device. Specifically, there may be a limited time for transmission of data between the vehicle and the interrogation device, due to the fact that the vehicle may be traveling past the interrogation device or may only be stopped for a brief time period. In these instances, it is advantageous to decrease the time required to transmit data between the data bus and the interrogation device. Further, systems are needed that record data concerning the vehicle during operation and systems that store data for transmission to a vehicle at a later time.

SUMMARY OF THE INVENTION

As set forth below, the apparatus, methods, and computer program products of the present invention may overcome many of the deficiencies identified with wireless data communication between remote interrogation devices and the data bus of vehicles. In particular, the present invention provides several apparatus, methods, and computer program products that establish a data communication link between a remote interrogation device and the data bus of a vehicle with reduced transmission delay. Due to this reduced transmission delay, modifications to the existing software of the interrogation device may not be necessary. As such, remote, wireless interrogation devices may be designed or retrofitted in a cost affective manner. Additionally, the present invention provides apparatus and methods that isolate the data bus of a vehicle from the transceiver used for remote, wireless communication when a data communication link is not established, such that false data, such as spurious signals, are not applied to the data bus.

Further, the present invention provides apparatus and methods that facilitate data communication with a vehicle, when the vehicle is located within the transmission and reception range of the interrogation device. Also, the present invention provides apparatus and methods that can facilitate the establishment of a data communication link with one vehicle in environments where several vehicles are within the transmission and reception area of the interrogation device.

Additionally, the present invention provides apparatus and methods that can increase the amount of data transmitted between the data bus of a vehicle and a remote interrogation device during a given data link time. Also, the present invention can store data related to the vehicle during the operation of the vehicle for later transmittal to a remote interrogation device or store data at a remote interrogation device for later transmittal to the data bus of a vehicle.

As discussed above, one problem with conventional, retrofit, interrogation devices is the need to update or reprogram the existing software to accommodate for delays associated with wireless transmission of data. To remedy problems associated with wireless data transmission delays, the present invention provides an apparatus for validating data transmitted to and data transmitted from a data bus, such that receipt of looped or false data either by the data bus or the remote location is eliminated. Further, the present invention analyzes the data bit by bit such that the data is transmitted in a wireless format with minimal delay.

The apparatus of this embodiment includes a local transceiver in operable electrical communication with the data bus of the vehicle. This local transceiver is used to transmit data from the data bus to a remote location and receive data transmitted to the data bus from a remote location. Connected to the local transceiver is a local processor that analyzes data either transmitted to or received from the data bus.

In operation, the local processor analyzes data received by the local processor one bit at a time to decrease delay in data processing. Additionally, the local processor analyzes the data received by the local processor and prevents propagation of looped or false data from being transmitted to either the data bus or to the remote location. As such, the apparatus of the present invention allows for wireless data communication with minimal delay, while also alleviating problems associated with receipt of looped or false data that is received by the local processor when data is transmitted to either the data bus or a remote location.

In one embodiment, the local processor of the present invention decreases the delay for transmission of data by monitoring the edge of each bit. Specifically, the local processor of this embodiment determines the value of each bit of the data by sensing a transition in logic states in the data, such that the local processor processes the data with minimal delay.

In addition to providing an apparatus and method for establishing a data link having minimum delay between a data bus of a vehicle and a remote interrogation device, the present invention also provides computer program products. Specifically, the present invention provides a computer readable storage medium having computer readable program code means embodied in the storage medium. The computer-readable program code means include first computer-readable program code means for analyzing data transmitted to and from the data bus one bit at a time, such that data may be transmitted to and from the data bus with minimal delay. The computer-readable program code means also includes a second computer-readable program code means for preventing propagation of looped or false data to the remote location when data is transmitted to the data bus and propagation of false data to the data bus when data is transmitted from the data bus to the remote location.

In addition to providing apparatus, methods, computer program products that validate with minimal delay data transmitted to and from the data bus of a vehicle, the present invention also provides apparatus and methods for establishing a data communication link between a data bus of a vehicle and a remote interrogation device, where false data due to signal noise may otherwise be received by the data bus and corrupt data on the data bus. The apparatus of this embodiment includes a local transceiver in operable electrical communication with the data bus of a vehicle for transmitting data to and transmitting data from the data bus. Connected to both the local transceiver and the data bus is a local processor. The apparatus of this embodiment also includes a switch in operable electrical communication with the local processor, local transceiver, and the data bus. The switch has a closed position in which it connects the local transceiver and the data bus and an open position in which it isolates the local transceiver from the data bus.

In operation, when a data link is to be established between the data bus of a vehicle and a remote interrogation device, the processor closes the switch, such that the data bus may receive data transmitted to the vehicle via the local transceiver. Importantly, in instances in which data is not transmitted to the data bus of the vehicle, the local processor opens the switch to thereby isolate the data bus from the transceiver. As such, the apparatus of the present invention allows for remote data communication with the data bus of the vehicle, while also allowing the data bus to be isolated from receipt of false data due to outside noise signals, when the data bus is not receiving external data signals to thereby alleviate corruption of existing data on the data bus.

As discussed above, the present invention provides an apparatus and method for isolating the data bus from false data due to external noise when the data bus is not receiving external data. In some embodiments of the present invention, it is advantageous to alert the local processor that a remote interrogation device is attempting to form a data communication link with the data bus of the vehicle, such that the processor will close the switch connecting the data bus to the local transceiver. In this embodiment of the present invention, the apparatus further includes a remote interrogation device having a remote transceiver in electrical communication with a remote processor for transmitting data to and receiving data from the data bus of the vehicle.

In operation, in a data transfer mode in which the remote interrogation device attempts to establish a data communication link with the data bus of the vehicle, the remote processor transmits a data link command to the local processor. Upon receipt of the data link command, the local processor closes the switch to thereby establish a data communication link between the data bus of the vehicle and the remote processor of the interrogation device.

As discussed previously, in some embodiments, the remote transceiver may have a limited transmission and reception range, outside of which vehicles may receive either corrupted or intermittent data signals. In these instances, it may be advantageous to delay connection of the data bus with the local transceiver until the vehicle is within the transmission and reception range of the interrogation device.

In this embodiment of the present invention, the apparatus further includes a counter in electrical communication with the local processor for counting the number of times the data link command is transmitted by the remote processor of the interrogation device. In this embodiment, the remote processor sequentially transmits a plurality of data link commands to the local processor. The counter counts the number of times the data link command is received by the local processor, and the local processor compares the counts indicated by the counter to a predetermined threshold value. When the counts indicated by the counter equals the threshold value, the local processor closes the switch to thereby create a data communication link between the remote processor and the data bus of the vehicle.

In another embodiment of the present invention, the remote processor sequentially transmits a data link command at predetermined time intervals to the local processor. The counter counts the number of times the data link command is received by the local processor, and the local processor monitors the time interval between receipt of each data link command. If the processor data link command is not received during the predetermined time interval, the local processor resets the counter. As such, the data link command must be received consecutively a number of times equal to the data link threshold value before the local processor will establish a data communication link with the remote interrogation device.

This embodiment helps to ensure that the vehicle is within the transmission and reception range of the interrogation device before a data communication link is established. Specifically, vehicles either on the fringe or not within the transmission and reception range of the interrogation device are more likely to receive an intermittent or corrupted data link command. By resetting the counter each time a data communication link is not received within the predetermined time interval, the present invention can alleviate the formation of a data communication link with a vehicle either on the fringe or outside the transmission and reception range of the interrogation device.

In a further embodiment, the data link threshold value may have a selected value that is sufficiently large such that vehicles located outside or on the fringe of the data transmission and reception range of the remote transceiver of the interrogation device are more likely to not establish a data communication link with the interrogation device. Specifically, in this embodiment, the local processor of the vehicle may only intermittently receive the periodic data link command transmitted by the remote processor due to the vehicle's location outside or on the fringe of the transmission and reception range of the interrogation device. As such, the local processor of the vehicle will reset the counter each time a data link command is missed. If the data link threshold value is set sufficiently large, the vehicle will most likely not receive the data link command enough times consecutively to exceed the individual data link threshold value associated with the vehicle.

In addition to providing an indication to the local processor that a remote interrogation device is attempting to form a data link with the data bus of the vehicle, in some embodiments it may be advantageous to alert both the local and remote processors that a data communication is established and also to alert the local and remote processors when a data communication link has ended. In this embodiment of the present invention, in the data transfer mode, both the local and remote processors periodically transmit a heartbeat signal to each other indicating an established data communication link between the remote processor and the data bus. In this embodiment, the local and remote processors monitor a time interval between receipt of the periodic heartbeat signals, and if the heartbeat signal is not received within a predetermined time interval, the local or remote processor determines that the data communication link is no longer viable. At this point, if the local processor determines that the data communication link is no longer established, it will open the switch to thereby isolate the data bus from the local transceiver and alleviate the introduction of false data in the form of signal noise into the data bus. If the remote processor no longer receives the heartbeat signal from the local processor, it will cease transmitting data to and attempting to receive data from the data bus of the vehicle.

As discussed previously, there may be instances in which more than one vehicle is in the vicinity of the remote interrogation device, and the user wishes to establish a data communication link with one of the vehicles. As such, one embodiment of the present invention provides an apparatus for establishing a data communication link between a data bus of one of at least two vehicles and an interrogation device having a remote processor and a remote transceiver. In this embodiment of the present invention, the apparatus includes a communication unit located on each of the vehicles. Each of the communication units includes a local transceiver in operable electrical communication with the data bus of the associated vehicle and a local processor in operable electrical communication with both the local transceiver and the data bus.

In operation, the remote processor of the interrogation device controls the remote transceiver to transmit a periodic data link command to the local processor of each of the communication units. Each of the local processors of the communication units receive the periodic data link command and compare the number of times the data link command has been received to a individual data link threshold value that differs for each vehicle. When the number of times the data link command is received equals the individual data link threshold value associated with one of the vehicles, the local processor of the communication unit associated with the vehicle closes its associated switch to form a data communication link between the bus of the vehicle and the remote processor of the interrogation device. As such, a data communication link is formed between the interrogation device and the data bus of the vehicle. After a data communication link has been established with one of the vehicles, the remote processor ceases transmission of the data link command, such that the remaining vehicles will not receive the command and attempt to establish a data link while the remote processor is transmitting data to the first vehicle.

An important aspect of this embodiment of the present invention is that the data link threshold value associated with each vehicle is preferably different from the other vehicles. As such, when the number of times the data link command has been sent equals the data link threshold value associated with one of the vehicles, the present invention will establish a data communication link with that vehicle, as opposed to establishing a data communication link with all vehicles in the transmission and reception range of the interrogation device.

As discussed, in this embodiment of the present invention, each of the vehicles has an individual data link threshold value that is different from the other vehicles. To create the individualized data link threshold values for each vehicle, in one embodiment of the present invention, the communication unit for each vehicle further includes a random number generator in electrical communication with the local processor. In this embodiment of the present invention, the data link threshold value associated with each vehicle is defined by a preset number and a number generated by the random number generator associated with each vehicle.

In operation, the random number generator associated with each vehicle generates a random number that is added to the preset number to create an individual data link threshold value for each vehicle. In this embodiment, similar to the previous embodiment, each of the local processors of each of the communication units receives the periodic data link command and compares the number of times the data link command has been received to the individual data link threshold value associated with the vehicle. When the number of times the data link command is received equals the individual data link threshold value associated with the vehicle, the local processor of the communication unit associated with the vehicle forms a data link between the bus of the vehicle and the remote processor. In one further embodiment of the present invention, the local processors reset the associated counters, if a data link command is missed by the local processor, such that the local processor must receive a consecutive number of data link commands equaling the data link threshold value before a data communication link will be made.

In addition to providing apparatus and methods that establish data communication links between the data bus of a vehicle and a remote interrogation device, the present invention also provides apparatus and methods for storing data related to the vehicle during operation of the vehicle, such that the data may be later transferred to a remote interrogation device. Additionally, the present invention provides apparatus and methods that store data in a remote interrogation device for latter transfer to a vehicle during a data communication link with the vehicle.

In the first of these embodiments, the present invention further includes a local memory device in electrical communication with the local processor. During the operation of the vehicle, the local processor receives data relating to the operating parameters of the vehicle and/or its cargo and stores the data in the local memory device. When the local processor establishes a subsequent data communication link with a remote processor, the stored data in the local memory device can be transmitted to the remote interrogation device for permanent storage and analysis.

In the second of these embodiments, the present invention further includes a remote memory device in electrical communication with the remote processor. In this embodiment of the present invention, the remote memory device includes data to be transmitted to the data bus of a vehicle, such that in a subsequent data communication link with the data bus of the vehicle, the remote processor transmits this data to the vehicle.

An additional aspect of both of these embodiments, is that in some instances the data stored in either the local or remote memory devices may be transmitted by the local and remote processors at a relatively high data transmission rate, as compared to the data speed of the data bus. Specifically, in these embodiments, the data may be transmitted by the local and remote processors and when received by the corresponding system, buffered in the local and remote memory devices prior to application to either the data bus or the remote processor for processing. As such, data information may be transmitted quickly in embodiments where the time interval available for establishing a data communication link is relatively small, such as in the instance in which the vehicle is moving past the interrogation device on a highway.

DETAILED DESCRIPTION OF THE INVENTION

Figure 1:
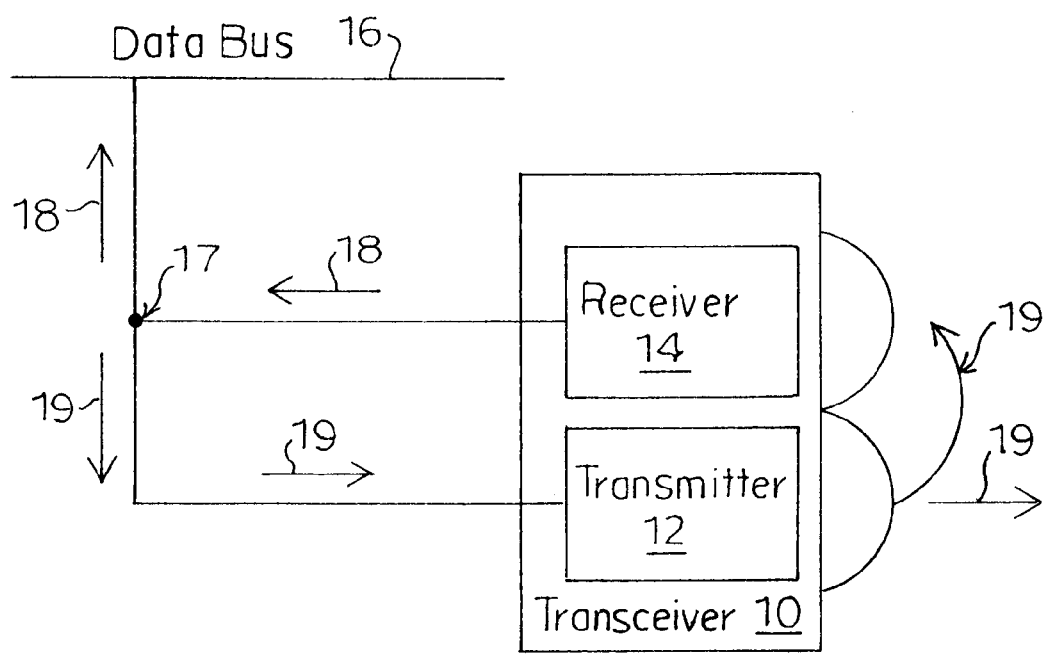
FIG. 1 is a block diagram of a conventional apparatus used for transmitting and receiving data from the data bus of a vehicle.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As detailed below, the present invention provides apparatus, methods, and computer program products for validating data transmitted to and from the data bus of a vehicle and apparatus and methods for establishing data communication links with vehicles. Importantly, the present invention provides apparatus, methods, and computer program products that analyze data transmitted to and from the data bus of a vehicle in a bit by bit format and isolate the data bus and remote interrogation device from the receipt of looped or false data. By analyzing the data in a bit by bit format and isolating the data bus and interrogation device from false data in the form of looped data, the present invention can be used to replace conventional direct connection systems without requiring significant cost to reconfigure existing diagnostic and data collection software of existing and newly designed interrogation devices.

Additionally, the present invention provides apparatus and methods for establishing a data communication link between a remote interrogation device and the data bus of a vehicle. In one embodiment, the present invention provides a switch that isolates the data bus of the vehicle from receipt of false data in the form of signal noise from a transceiver when the data bus is not receiving data from a remote interrogation device. In another embodiment, the present invention provides data link commands from a remote interrogation device to a vehicle to alert the vehicle that the interrogation device is attempting to establish a data communication link with the data bus of the vehicle. In this embodiment, when the vehicle receives the data link command, the present invention connects the data bus to a transceiver such that a data communication link can be made between the data bus and the remote interrogation device. In a further embodiment, the present invention provides a periodic heartbeat signal that is transmitted by both a local and remote processor indicating an established data link between the remote processor and the data bus. In this embodiment, if the vehicle ceases receiving the heartbeat signal, the vehicle determines that the data communication link has ended and will isolate the data bus from the transceiver. Likewise, if the remote processor ceases receiving the heartbeat signal, it will cease transmitting data to the vehicle and attempting to receive data from the vehicle. Further, the present invention provides embodiments, that allow a remote interrogation device to establish a data communication link with one vehicle, when other vehicles are located in the transmission and reception range of the interrogation device. The present invention also includes embodiments that can restrict a vehicle that is on the fringe of the transmission and reception range of an interrogation device from attempting to establish a data communication link with the interrogation device.

Further, the present invention provides apparatus and methods that store data concerning the vehicle during operation for subsequent transmittal to a remote interrogation device. Likewise, the present invention also includes apparatus and methods that store data for subsequent transmittal to a vehicle when a data communication link is formed with the vehicle. The storage of data may also allow the present invention to transmit data to and from the vehicle at relatively fast processing speeds in excess of the speed of the data bus in instances where time for a data communication link is limited. Specifically, in these instances, data is transmitted and stored in the memory devices for later application to the data bus or processing by the interrogation device.

By processing data with minimal delay, isolating both the data bus and the remote interrogation device from receipt of looped or false data, isolating the data bus from external noise when the data bus is not communicating with the remote interrogation device, and providing information concerning the initiation and status of a data communication link, the present invention provides a system that is more easily implemented in existing and future interrogation devices. Further, the present invention provides a system that minimizes the introduction of noise into the data bus of vehicles and may provide a practical system of data communication.

The apparatus, methods, and computer programs products discussed in detail below are used in conjunction with wireless transmission systems and remote interrogation devices. The assignee of the present application has designed and developed various wireless communication systems and interrogation devices. Many of these systems are described in detail in U.S. patent application Ser. No. 08/594,255 entitled: Systems and Methods for Identifying Tractor/Trailers and Components Thereof and U.S. patent application Ser. No. 08/907,861, entitled: Apparatus and Method for Data Communication Between Heavy Duty Vehicles And Remote Data Communication Terminal, the contents of both of which are incorporated herein by reference.

The various apparatus, methods, and computer program products are detailed below in conjunction with the data bus of a heavy duty vehicle, such as a tractor-trailer combination. It must be understood that this disclosure is for illustrative purposes only and is not meant to limit the scope of the present invention. Specifically, the present invention may be configured to operate within the specific architecture of the data bus of many different types of vehicles. For instance, the present invention may be used with cars, trucks, vans, tractors and other farm equipment, construction equipment, aircraft, trains, etc.

As detailed above, an initial problem with remote data communication with the data bus of a vehicle is the infrastructure and protocol used by the data bus and the transceiver. Specifically, because the data bus requires approximate real-time data communication to determine the idle states of the data bus, excessive delays in the data communication link with the data bus may not be acceptable. For example, many conventional wireless systems have sufficient data processing delays such that data must be buffered and the software of the interrogation device must be reprogrammed to account for this buffering of data. An additional problem is because of the infrastructure and protocol of the data bus and the nature of the RF and IR transceivers, data transmitted to and from the data bus is also received as looped or false data. This false data can corrupt either the data bus of the remote interrogation device.

Figure 2:
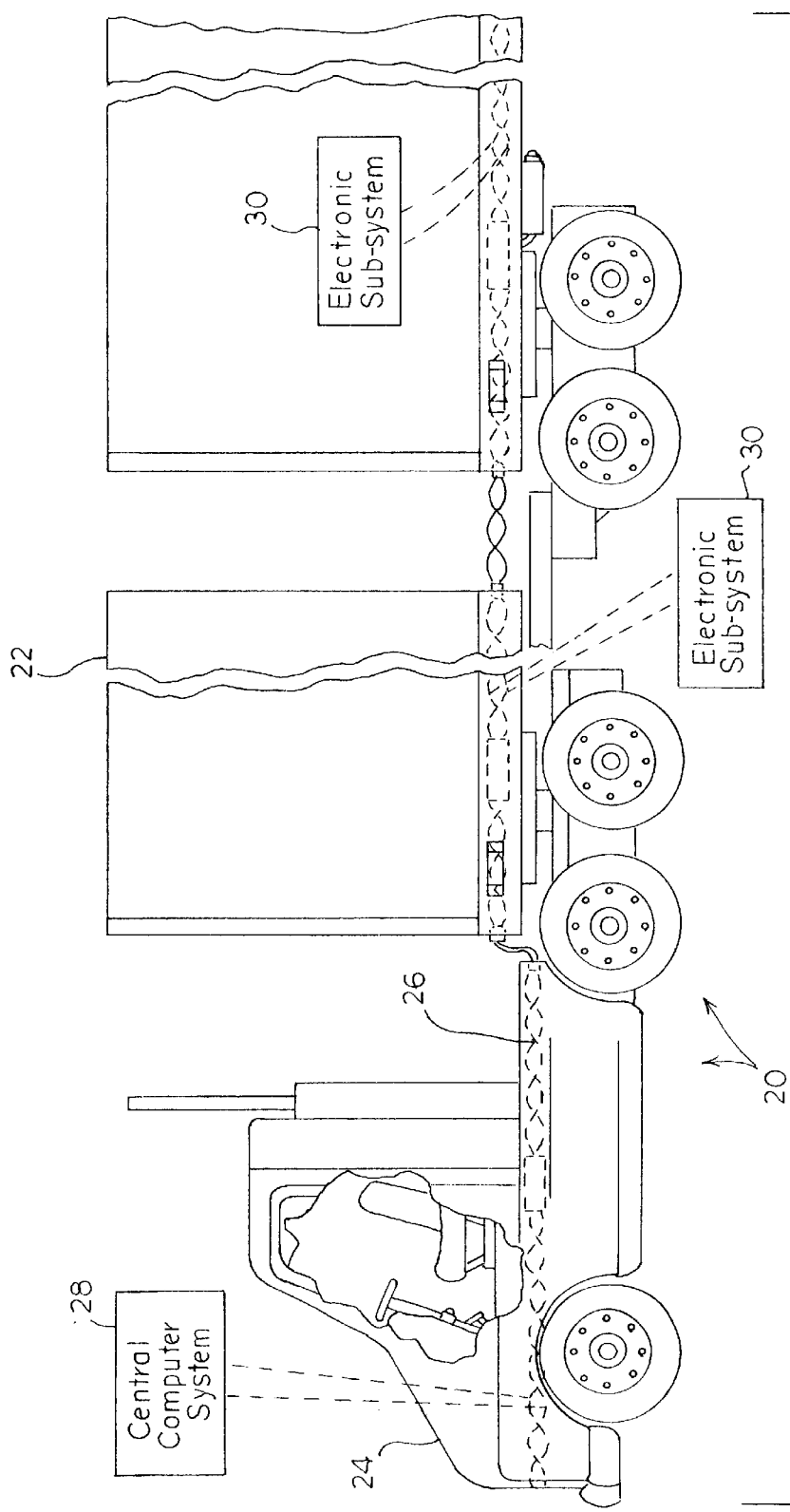
FIG. 2 is a side elevation view of a vehicle in which the various apparatus, methods, and computer program products may be implemented to establish a remote data communication link between the vehicle and a remote interrogation device according to one embodiment of the present invention.
Figure 3:
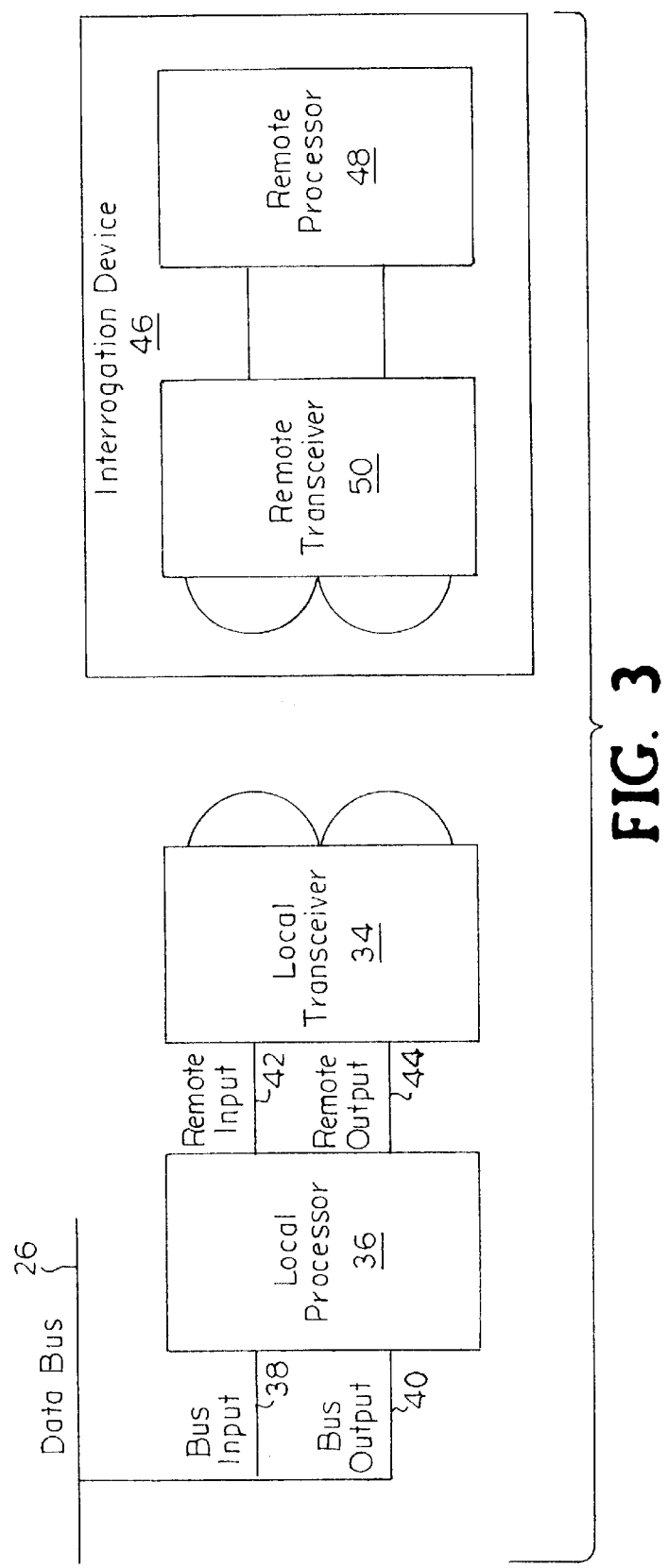
FIG. 3 is a block diagram of an apparatus for validating with minimal delay data transmitted to a data bus of a vehicle from a remote location and data transmitted from the data bus of the vehicle to a remote location according to one embodiment of the present invention.

With reference to FIGS. 2 and 3, an apparatus according to one embodiment of the present invention is illustrated in conjunction with the data bus of a vehicle. With reference to FIG. 2, an illustration of a typical vehicle with which the present invention may be implemented is shown. Specifically, FIG. 2 illustrates a tractor-trailer combination vehicle 20, including a trailer 22 and a tractor 24 for pulling the trailer. Importantly, the vehicle includes a data bus 26 that is routed through the tractor and trailer for transmitting data between a central computer system 28 and various sub-systems 30. As known to those skilled in the art, the various subs-systems provide a variety of information relating to the vehicle and its cargo. For instance, a vehicle may include subsystems that provide information such as the identification of the vehicle, individual tire pressures, mileage, cargo information, anti-lock brake status, engine status, engine diagnostics, etc.

The data bus of a tractor-trailer vehicle is typically a physical RS 485 differentially driven, twisted pair and the standard protocol is J1708 or J1939. In the case of J1708 protocol, the bus is differentially driven at 9600 baud, while the J1939 is a CAN protocol and differentially driven at 250 kilobaud. The twisted pair is half duplexed such that one wire transmits the data and the second wire is a mirror image for data transmission. The data bus does not include a command for transmitting data. Instead, systems that transmit on the data bus must wait for an idle state on the data bus. The protocol typically uses non-return to zero (NRZ) encoding and includes a start bit of logic "0" and a stop bit of logic "1" that proceed and trail each 8bit data packet. Because each data packet is 10 bits and the last or stop bit is logic "1," a string of 10 logic "1" bits or more defines an idle state on the bus.

With reference to FIG. 3, to communicate with the data bus of the vehicle, the present invention provides an apparatus 32 for validating with minimal delay data transmitted to the data bus and data transmitted from the data bus. The apparatus 32 includes a local transceiver 34 that is in operable electrical communication with the data bus 26 of the vehicle shown in FIG. 2. Connected to both the data bus and the transceiver is a local processor 36. The local processor includes a bus input line 38 for inputting data to the data bus and a bus output line 40 for receiving data from the data bus for transmission to a remote location. The local processor also includes a remote input data line 42 for receiving data from the local transceiver for input to the data bus and a remote output line 44 for transmitting data from the data bus via the local transceiver to a remote location. Remote from the data bus is an interrogation device 46. The interrogation device includes a remote processor 48 and a remote transceiver 50.

As discussed above, communication systems are needed that can transmit data to and from the data bus with minimal delay, such that neither the data bus nor the software used by remote the interrogation devices sense a delay. Further, communication systems are needed that prevent the introduction of looped or false data into either the data bus or a remote location. The apparatus of the present invention can overcome these problems. Specifically, the local and remote processors, 36 and 48, of the present invention analyze data transmitted to and data transmitted from the data bus bit by bit such that the data is analyzed with minimal delay. Additionally, the local and remote processors, 36 and 48, of the present invention prevent propagation of looped or false data to either the data bus or to the remote location, such that neither the data bus nor a remote interrogation device are corrupted by false data generated by the transmission of data to and from the data bus.

Figure 4:
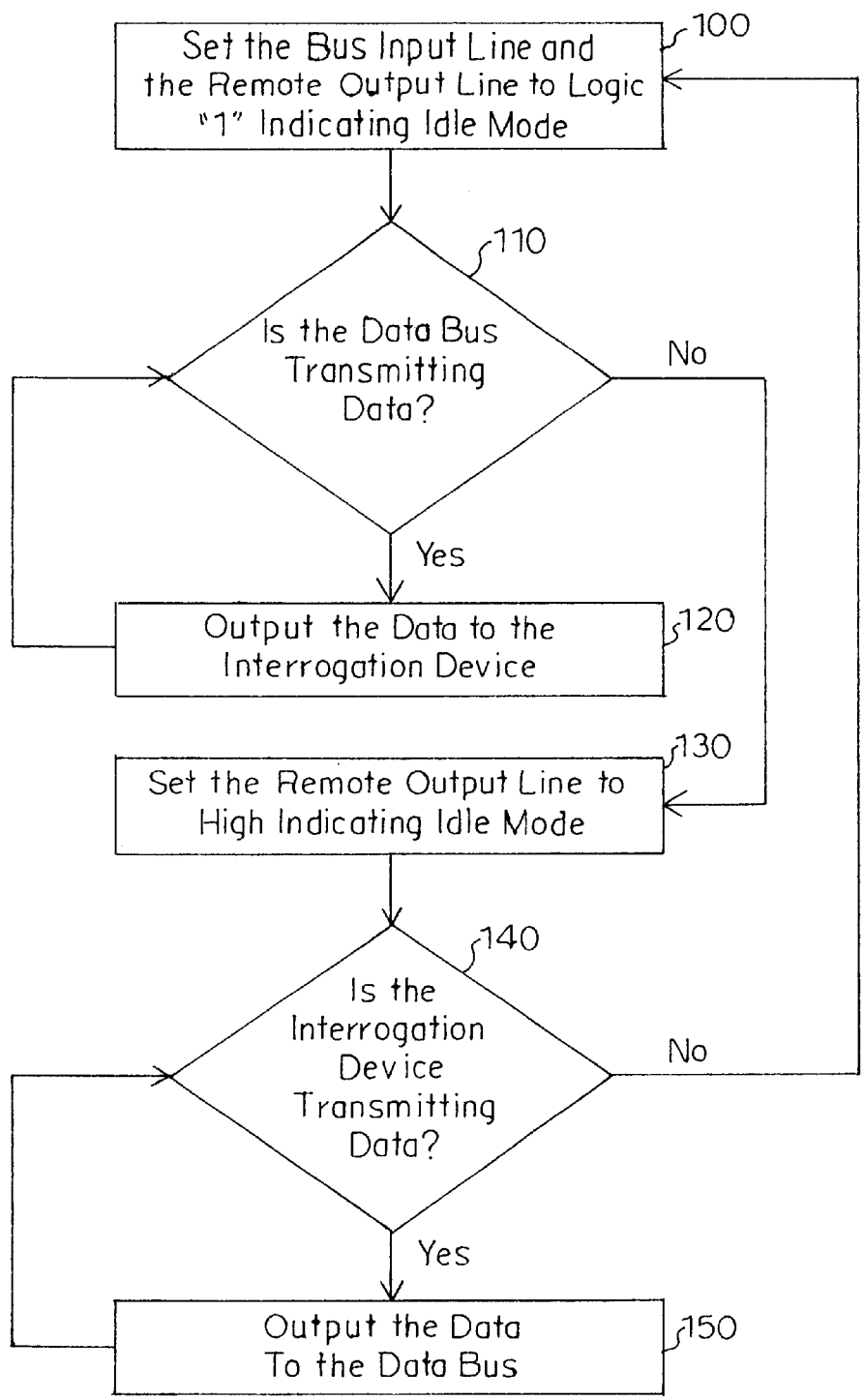
FIG. 4 is a block diagram of the operations performed to validate with minimal delay data transmitted to a data bus of a vehicle from a remote location and data transmitted from the data bus of the vehicle to a remote location according to one embodiment of the present invention.

Specifically, with reference to FIG. 4, to analyze the data bit by bit and prevent propagation of looped or false data, both the local and remote processors analyze the data in a similar fashion as described below. The method illustrated in FIG. 4 is described with relation to the local processor 36, however, it is understood that similar appropriate steps are performed by the remote processor 48. Initially, the local processor 36 sets the bus input line 38 and the remote output line 44 to logic 1 indicating an initial idle bit or mode to both the data bus and the remote interrogation device. (See step 100). The processor 36 initially analyzes the bus output line 40 to determine whether the data bus is transmitting data, (i.e., a logic "0"), to the remote interrogation device. (See step 110). If the bus output line 40 contains data, the processor 36 outputs the data on the remote output line 44, (see step 120), which, in turn, is transmitted by the transceiver to the remote interrogation device. The processor 36 continues to transmit the data on the remote output line 44 as long as the bus output line 40 contains data. (See steps 110 and 120). As described later, if the bus output line 40 does not contain data, the processor 36 analyzes the remote input line 42 to determine whether the remote interrogation device is transmitting data. (See step 140).

When data is no longer transmitted on the bus output line 40, the processor 36 sets the remote output line 44 to high indicating that it is idle. (See step 130). Next, the processor 36 analyzes the remote input line 42 to determine whether the remote interrogation device is transmitting data to the data bus, (i.e., a logic "0"). (See step 140). If the remote input line 42 contains data, the processor 36 outputs the data on the bus input line 38, (see step 150), which, in turn, is applied to the data bus. The processor 36 continues to transmit data on the bus input line 38, as long as the remote input line 42 contains data. (See steps 140 and 150). When data is no longer transmitted on the remote input line 42, the processor 36 sets the bus input line 38 to high indicating that it is idle. (See step 160).

With reference to the operation of the processor as illustrated in FIG. 4, the present invention prevents propagation of looped or false data to both the data bus and the interrogation device. Specifically, as described in FIG. 1, due to the data bus infrastructure and protocol and due to the transceivers, data transmitted to the data bus and to the remote interrogation device is received by the local and remote processors, 36 and 48, as false data in the form of looped data. The present invention prevents the propagation of the looped or false data by analyzing the data as described above. Specifically, when data is transmitted on the bus input line 38, (see step 150), the processor does not evaluate data present on the bus output line 40, as any data present on this line may be looped data caused by the transmission of the data to the data bus. As such, the looped or false data applied to the bus output line 40 is not transmitted to the remote interrogation device via the local transceiver. Similarly, when data is transmitted on the remote output line 44, (see step 120), the processor does not evaluate data present on the remote input line 42, as any data present may be looped data caused by the transceiver receiving data that it transmitted to the remote location. As such, false data in the form of looped data applied to the remote input line 42 is not applied to the data bus.

As detailed above, the processors, 36 and 48, of the present invention analyze the data one bit at a time, such that delay in data transmission is minimal. To accomplish this a processor is needed that analyzes the data at processing speeds corresponding to the baud rate of the data bus. Specifically, a bus that operates on the J1708 standard has a baud rate of 9600 bits/second or 104 microseconds ($10^{-6}$) per bit. In this embodiment, processors are needed that operate at a significant data processing speed, such that several instructions for analyzing the data can be performed without causing a delay in communicating at the 9600 baud rate used by the bus. For instance, if the processor has an operating speed of 200 nanoseconds ($10^{-9}$), then the processor can perform 250 instructions (i.e., 104 microseconds/ 200 nanoseconds). However, the number of instructions that may be performed must be reduced by the delay for transmission of the data. Specifically, there is associated delay with IR and RF transmission of the data that reduces the time allowed for processing of the data.

As an example, in one embodiment of the present invention, the processors operate at speeds of 200 nanoseconds and the data is transmitted using IR. In this embodiment of the present invention, the processor is controlled via software to analyze each bit of the data with 10 to 20 instructions, such that the data can be analyzed and transmitted within the baud rate limitations of the bus. To minimize the number of instructions, assembly code is used. As such, the present invention creates an approximate real-time data link between the data bus and the remote interrogation device. Importantly, the present invention performs analysis and transmission of the data with minimal delay, such that as seen by the data bus and the interrogation device a virtual wire connects the two. Thus, existing software in an interrogation device does not need updating to retrofit the device for wireless data communication.

As discussed the present invention analyzes the data bit by bit to process the data with minimal delay. To decrease the time required to process the data, in one embodiment of the present invention, the processors do not delay until it has received the entire bit value before processing. Instead, in one embodiment of the present invention, the processors determine the value of a data bit by sensing transition in logic states in the data such that the processors process the data with minimal delay. By processing the data based on logic transitions, the present invention can minimize delay in processing and transmitting the data.

In addition to providing apparatus and methods, the present invention also provides computer program products for validating with minimal delay data transmitted to a data bus of a vehicle from a remote location and data transmitted from the data bus of the vehicle to a remote location in a system where data transmitted to and from the data bus may also be received as false data. With reference to FIG. 3, the computer readable storage medium may be included within the processors, 36 and 48, of the present invention or may be comprised of a separate memory devices, not shown. The computer readable program code means may be implemented by the processors to analyze the data bit by bit.

The computer-readable program code means includes first computer-readable program code means for analyzing data transmitted to and from the data bus one bit at a time such that data may be transmitted to and from the data bus with minimal delay. Further, the computer-readable program code means also includes second computer-readable program code means for preventing propagation of false data to the remote location when data is transmitted to the data bus and propagation of false data to the data bus when data is transmitted from the data bus to the remote location.

With reference to the first computer-readable program code means, as discussed previously with respect to the various apparatus and methods of the present invention, the first computer-readable program code means analyzes the data received bit by bit to decrease delay. Additionally, in some embodiments, the first computer-readable program code means may determine the value of each bit of the data by sensing transition in logic states in the data such that the computer program product processes the data with minimal delay.

With reference to the second computer-readable program code means, as discussed previously with respect to the various apparatus and methods of the present invention, the second computer-readable program code means may prevent propagation of false data by processing the data one bit at a time and ignoring false data that is received when data is transmitted to or from the data bus.

In this regard, FIGS. 3 and 4 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

In addition to providing apparatus, methods, and computer program products for processing data bit by bit and preventing propagation of false data in the form of looped date, the present invention also provides apparatus and methods for establishing a data communication link with the data bus of a vehicle. As illustrated, the apparatus of the embodiments detailed later below include local and remote processors for establishing a data communication link between the interrogation device and the data bus of the vehicle. Specifically, the local and remote processors of the following embodiments are used to establish data links, transmit heartbeat signals, and store and process data. It must be understood that the local and remote processors discussed below may be the same processors that are also used as described above to process transmitted data bit by bit and prevent the introduction of looped or false data.

However, in at least one implementation of the present invention, dedicated local and remote processors are used for the functions of bit by bit processing and prevention of propagation of looped or false data as fast processing times are required. For higher level processing, however, such as establishing a data link, local and remote master processors are typically used. These master-type processors are in electrical communication with the transceiver, dedicated processor, and the data bus. In the various embodiments illustrated and discussed below, the processors are referred to generically as local and remote processors, it must be understood that each local and remote processor may include both a dedicated processor and a master processor or, alternatively, a single processor for performing all of the various functions. Therefore, the local and remote processors will be hereafter referenced as such without further reference to the dedicated and master processors.

Figure 5:
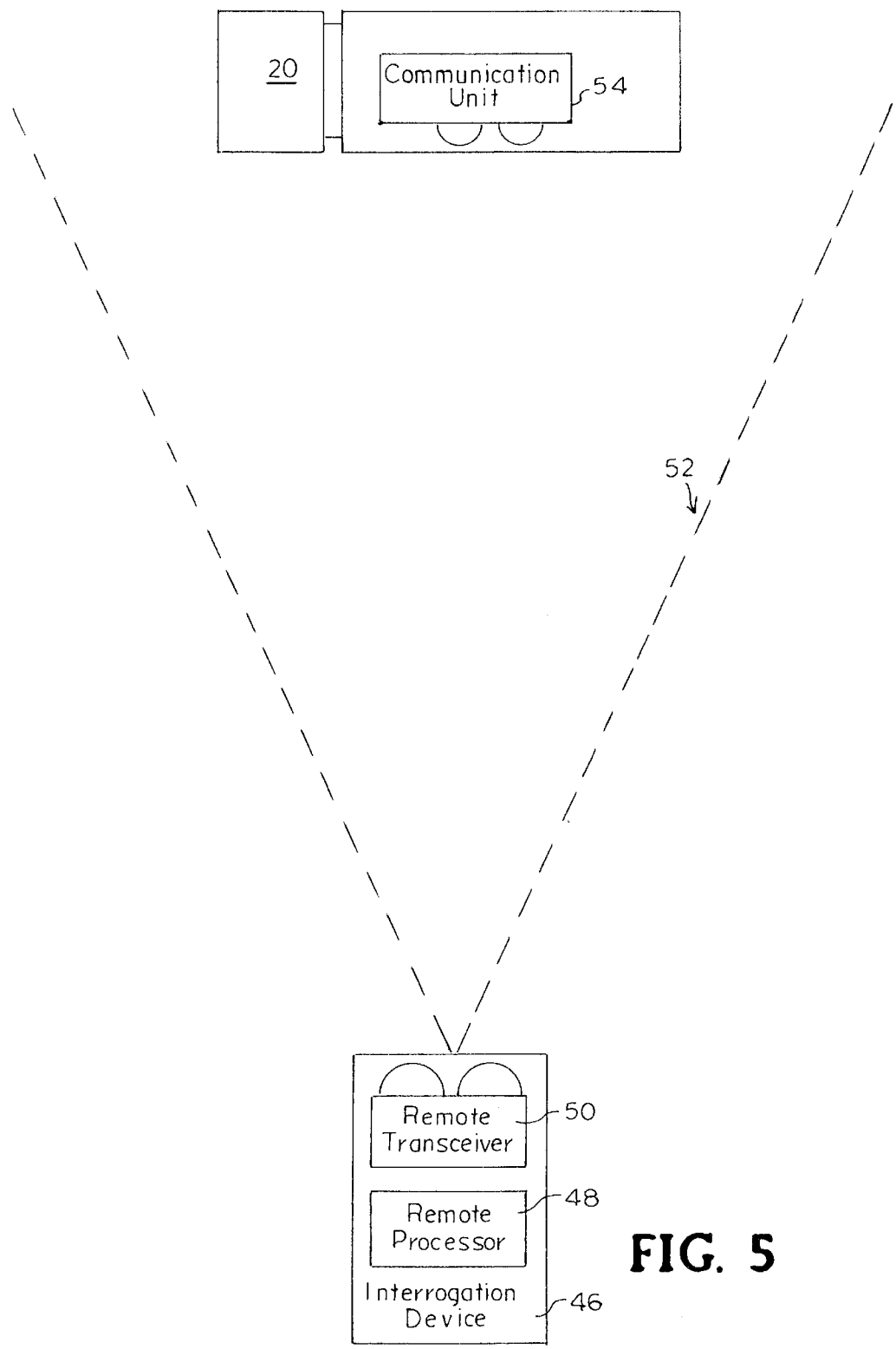
FIG. 5 is a partial block diagram and top view of a remote interrogation device in relation to a vehicle for which the present invention may be used to establish a data communication link.
Figure 6:
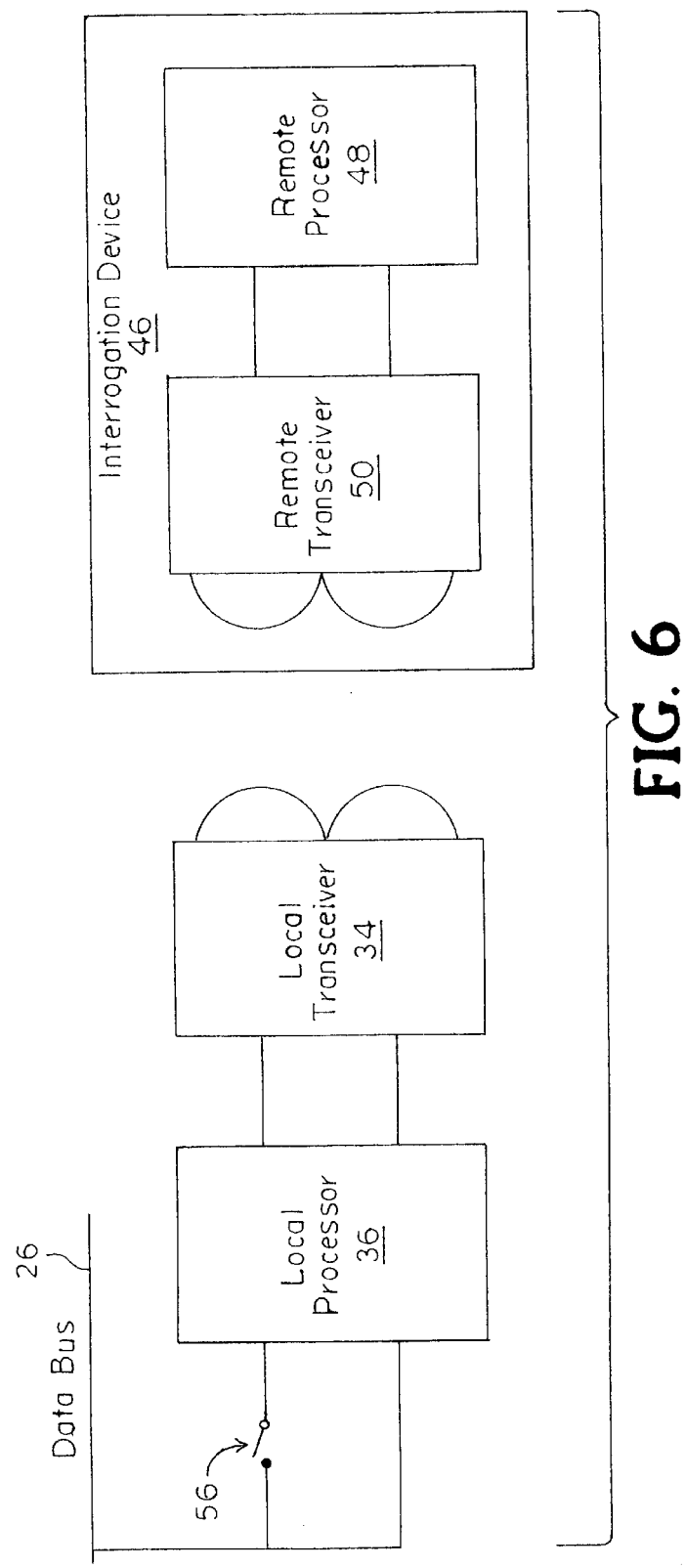
FIG. 6 is a block diagram of an apparatus for establishing a data communication link between a data bus of a vehicle and a remote interrogation device where unwanted signals may be received by the data bus and corrupt data on the data bus according to one embodiment of the present invention.
Figure 7:
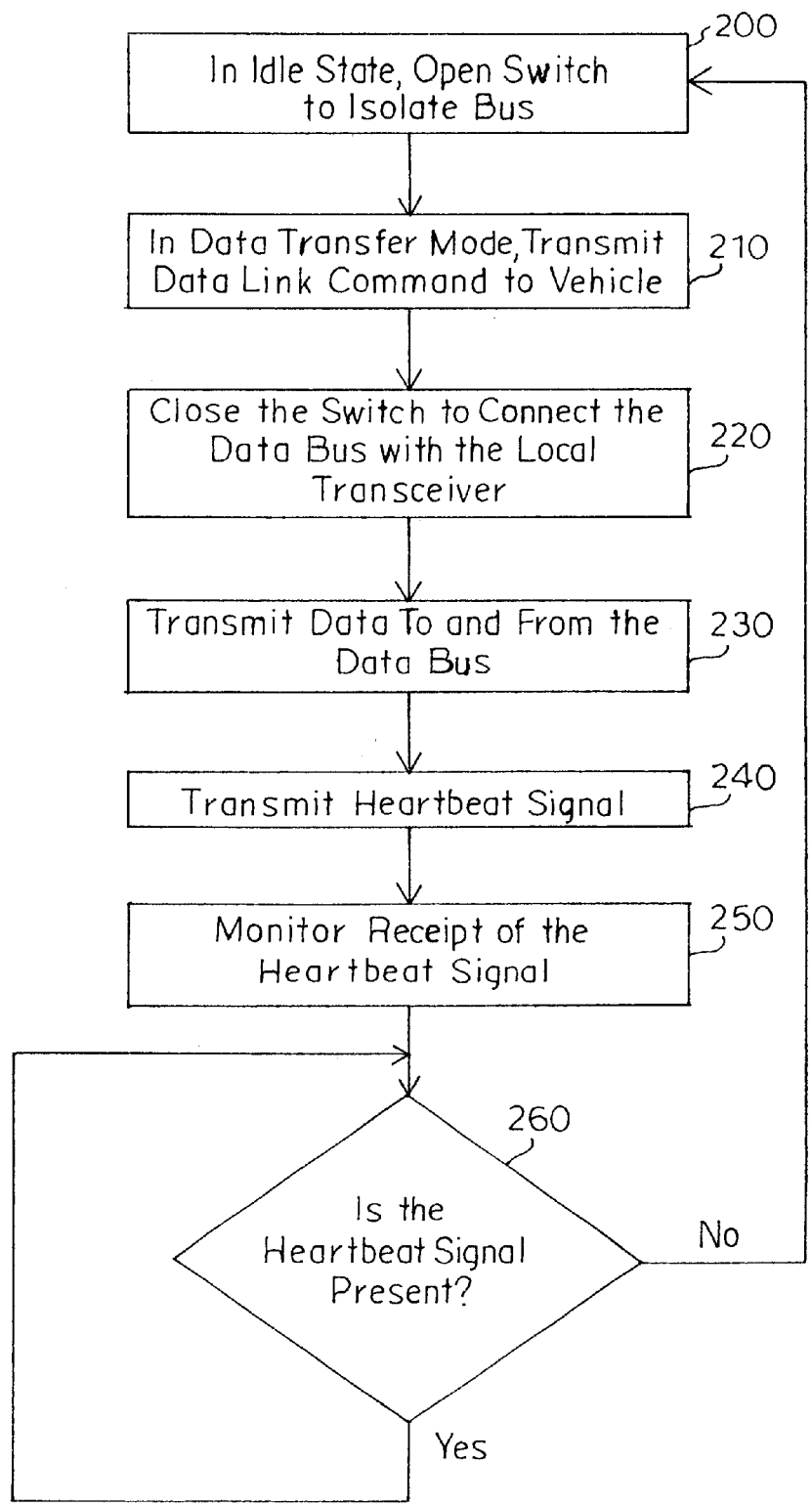
FIG. 7 is a block diagram of the operations performed to establish a data communication link between a data bus of a vehicle and a remote interrogation device where unwanted signals may be received by the data bus and corrupt data on the data bus according to one embodiment of the present invention.

In addition to processing data transmitted to and from the data bus with minimal delay, the present invention also provides apparatus and methods for establishing a data communication link between the data bus of a vehicle and a remote interrogation device. For instance, one embodiment of the present invention provides a method and apparatus that establish a data communication link between an interrogation device and the data bus of a vehicle, while also preventing the introduction of false data, such as signal noise into the data bus. With reference to FIGS. 5–7, the environment in which the present invention may be used and the apparatus and method are illustrated.

With reference to FIG. 5, in a typical embodiment, the present invention is used to receive and transmit data to and from the data bus of a vehicle from a remote interrogation device. This may be in a manufacturing setting, where the vehicle is moving past the interrogation device on an assembly line, in a freight or rental car return depot, on highways where vehicles are known to pass, in maintenance shops, etc. In these settings, the vehicle 20 may be at a remote location from the interrogation device 46 and has a communication unit 54. The interrogation device typically has as limited transmission range 52, outside of which the communication unit of the vehicle and the interrogation device will either receive corrupted and/or intermittent data signals. As such, it is typically advantageous to selectively establish a data communication link when the vehicle is within the transmission and reception range of the interrogation device.

With reference to FIG. 6, an apparatus according to one embodiment of the present invention for establishing a data communication link between a data bus of a vehicle and a remote interrogation device, where unwanted signals may be received by the data bus and corrupt data on the data bus, is shown. Specifically, the apparatus of this embodiment includes a local transceiver 34 in operable electrical communication with the data bus 26 for transmitting data to and transmitting data from the data bus. Connected to the transceiver 34 and the data bus 26 is a local processor 36. Further, the apparatus of this embodiment includes a switch 56 in operable electrical communication with the local processor, local transceiver, and the data bus. Importantly, in a closed position, the switch connects the local transceiver and the data bus and in an open position isolates the local transceiver from the data bus. It must be understood that the switch may be an integral part of the processor in some embodiments. Remote from the vehicle is an interrogation device 46. The interrogation device includes a remote processor 48 in electrical communication with a remote transceiver 50.

The apparatus of this embodiment of the present invention is important as it isolates the data bus of the vehicle from receipt of false data in the form of signal noise when the vehicle is either not within the transmission and reception range 52 of the interrogation device 50 or a data communication link is not currently established between the interrogation device and the data bus of the vehicle.

Specifically, with reference to FIG. 7, in an idle state, in which a data communication link is not established between the data bus and the interrogation device, the local processor opens the switch such that the data bus is not in electrical communication with the local transceiver. (See step 200). As such, false data in the form of signal noise received by the local transceiver from external sources, such as the sun and automobile headlights in the case of IR transmission and spurious RF signals in the case of RF transmission, is not input on the data bus. However, in a data transfer mode, in which it is desired to form a data communication link between the data bus of the vehicle and the interrogation device, the remote processor 48 of the interrogation device transmits a data link command to the local processor 36. (See step 210). After receiving the data link command, the local processor closes the switch to thereby establish a data link between the data bus and the remote processor. (See step 220). As such, the present invention alleviates the introduction of false data in the form of signal noise when data is not transmitted to the data bus of the vehicle, while also allowing a data communication link to be established between the data bus and the remote interrogation device in a data transfer mode.

As illustrated above, the remote processor, in a data transfer mode, transmits a data link command to the local processor of the present invention, such that the local processor closes the switch to thereby establish a data communication link between the data bus and the interrogation device. In some embodiments of the present invention, it is advantageous to communicate to both the local and remote processors that a data communication link is ongoing. More importantly, it is advantageous to notify the remote and local processors that a data communication link has ended, such that the local processor may again open the switch to alleviate the introduction of false data in the form of signal noise and the remote processor will cease transmitting data or attempting to receive data.

Specifically, with reference to FIG. 7, in one embodiment of the present invention, when data is transmitted between the data bus and the remote processor in a data transfer mode, (see step 230), both the remote processor and the local processor also periodically transmit a heartbeat signal to each other. (See step 240). The heartbeat signal is sent at predetermined time intervals and indicates to both the local and remote processors that a data communication link is established. In this embodiment, both the local and remote processors monitor the receipt of the periodic heartbeat signal. (See step 250). When either the local or remote processor is finished transmitting data, they will cease transmitting the heartbeat signal. If the heartbeat signal is not received by the local processor within the predetermined time interval from the last time the heartbeat signal was received, (see step 260), the local processor opens the switch thereby isolating the data bus from the local transceiver. (See step 200). If the heartbeat signal is not received by the remote processor within the predetermined time interval from the last time the heartbeat signal was received, (see step 260), the remote processor will stop transmitting or attempting to receive data.

As discussed, the heartbeat signal may be terminated by the local or remote processor when a data communication link has ended. In addition, the heartbeat signal may also cease if the vehicle or the remote interrogation device are moved relative to each other, such that one or neither are no longer within receiving range of the heartbeat signal. Specifically, due to the environment, orientation of the vehicle to the interrogation device, position of the vehicle on the fringe of the transmission and reception range of the interrogation device, or movement of the vehicle outside the transmission and reception range of the interrogation device, the data communication link may become distorted. In this embodiment, the heartbeat signal may not be received by either the local or remote processor indicating that the data communication link has become tenuous and no longer viable. As such, the local processor will open the switch to prevent false data in the form of signal noise from entering the data bus, and the remote processor will stop transmitting or attempting to receive data.

As discussed above, the local and remote processor transmit a heartbeat signal at predetermined time intervals. This predetermined time interval is typically selectable either by programming the processors or altering jumpers that are associated with the processors. The predetermined time interval may be any time interval. A typical time interval in the range of 1 to 5 seconds between transmission of the heartbeat signal is typically used.

In an alternative embodiment, a heartbeat signal is not used. Instead, the local and remote processors may analyze errors in the data transmitted. In this embodiment of the present invention, the processors monitor the data for errors and determine that the data communication link is no longer viable when a predetermined percentage of the data is received in error.

In addition to establishing a data communication link between one vehicle and a remote interrogation device, the present invention also provides apparatus and methods that establish a data communication link with one vehicle, when more than one vehicle is located in the transmission and reception range of the interrogation device. There may be instances in which two vehicles are within the vicinity of the interrogation device, such as in a freight yard, etc. In these instances, it may be preferable for the interrogation device to establish a data communication link with the vehicles one at a time, such that data bound for one vehicle is not received by the other vehicle and data from both vehicles are not simultaneously transmitted to the interrogation device. Further, it is typically advantageous that the remote interrogation device establishes a data communication link with a vehicle that is situated within the transmission and reception range of the interrogation device, as opposed to a vehicle either on the fringe or outside the transmission and reception range of the interrogation device.

Figure 8A:
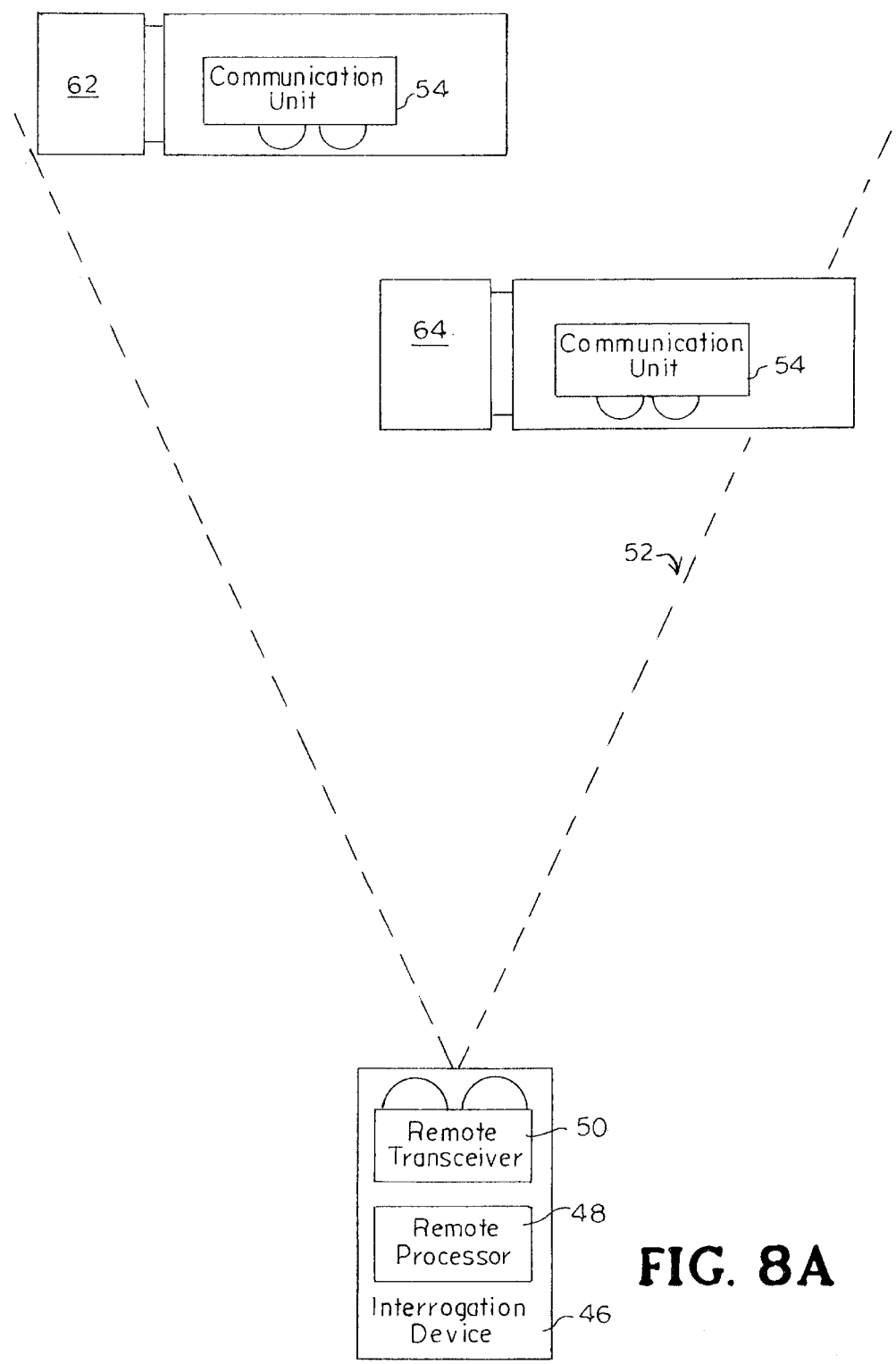
FIGS. 8A–8C are top views illustrating different scenarios for placement of vehicles in relation to a remote interrogation device for which the present invention can establish a data communication link between a data bus of one of the vehicles and the remote interrogation device according to various embodiments of the present invention.
Figure 8B:
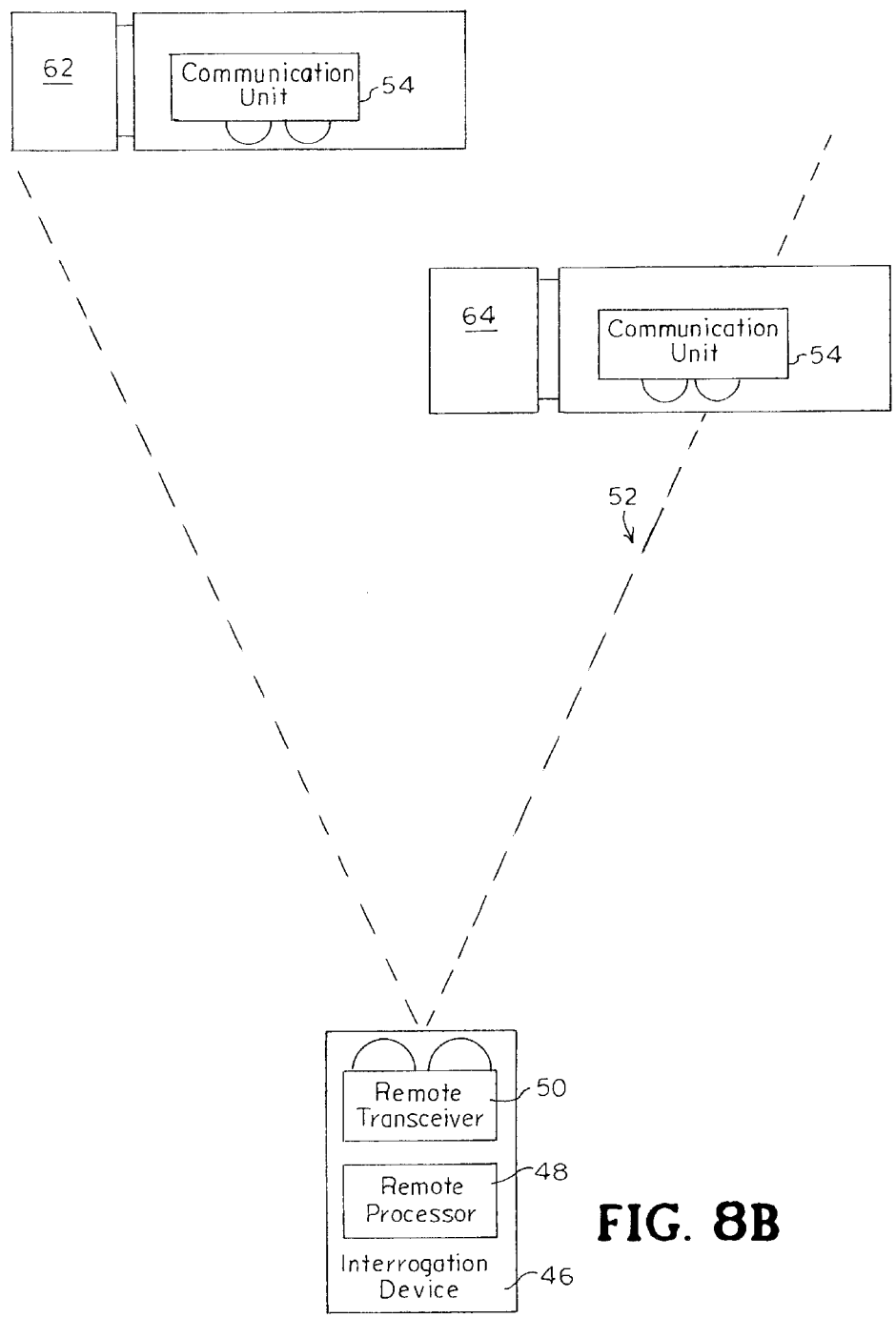
Figure 8C:
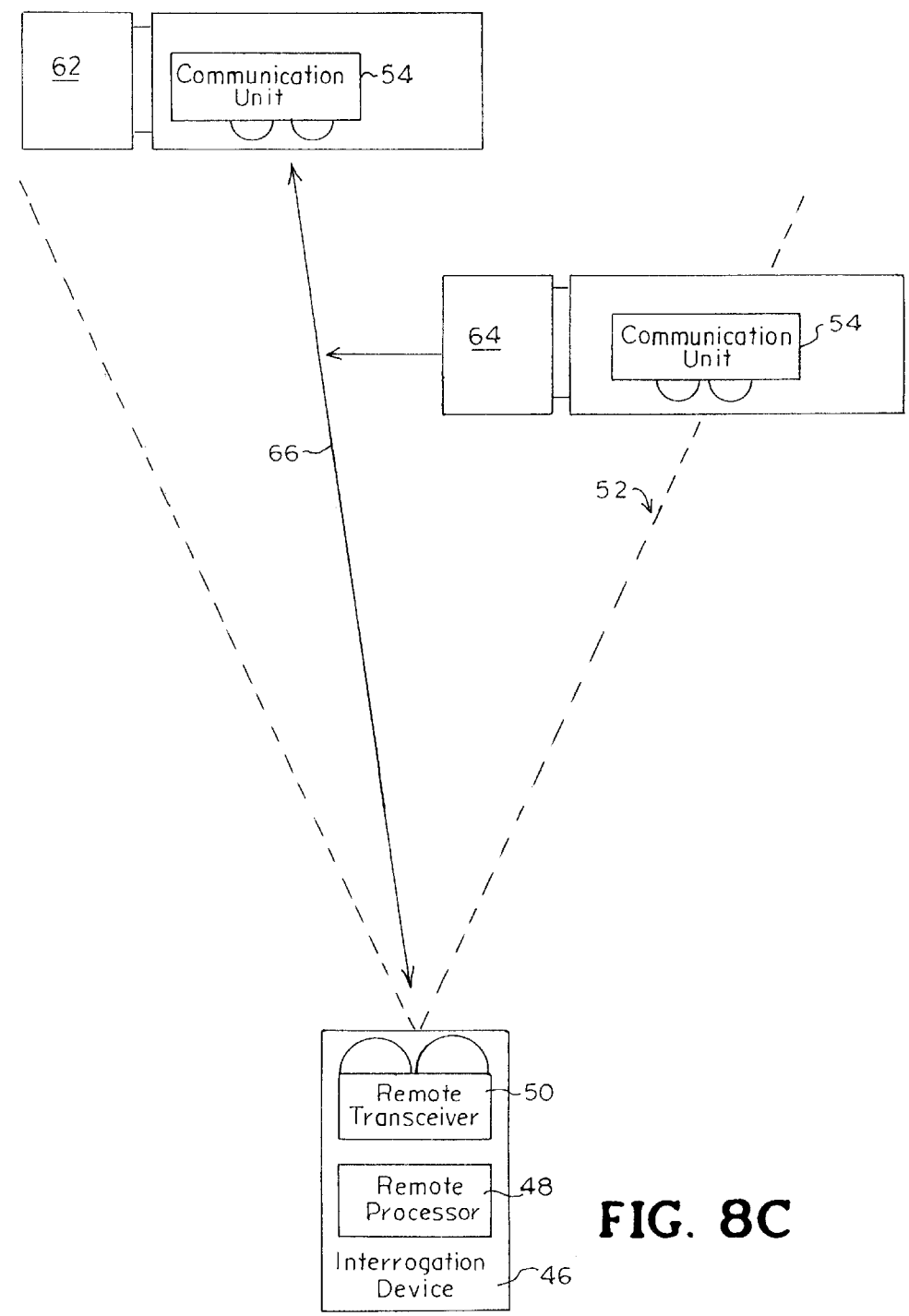

FIGS. 8A–8C illustrate three separate scenarios in which a system is needed to determine which of the vehicles the remote interrogation device should establish a data communication link. These figures do not illustrate all possible scenarios, but merely representative scenarios. With reference to FIG. 8A, there may be instances in which two or more vehicles, namely 62 and 64, are located in the transmission and reception range 52 of the interrogation device 46 at the same time. In this instance, it may be preferable that the interrogation device establish a data communication link with only one of the vehicles at a time. Similarly, in FIG. 8B, one of the vehicles, namely 64, may be located in the fringe portion of the transmission and reception range 52 of the interrogation device. In this instance, it may be preferable for the interrogation device to form a data communication link with the vehicle 62 located in the transmission and reception range of the interrogation device, as opposed to the vehicle on the fringe, as data communication with the vehicle on the fringe may have a higher chance of data errors.

Finally, FIG. 8C illustrates an instance in which an interrogation device has an established data communication link 66 with a first vehicle 62, while a second vehicle 64 enters the transmission and reception range of the interrogation device. In this instance, it is preferable for the interrogation device to maintain the data communication link 66 with the first vehicle 62, and for the second vehicle 64 to not receive or send data until the first data communication link has ended.

Figure 9:
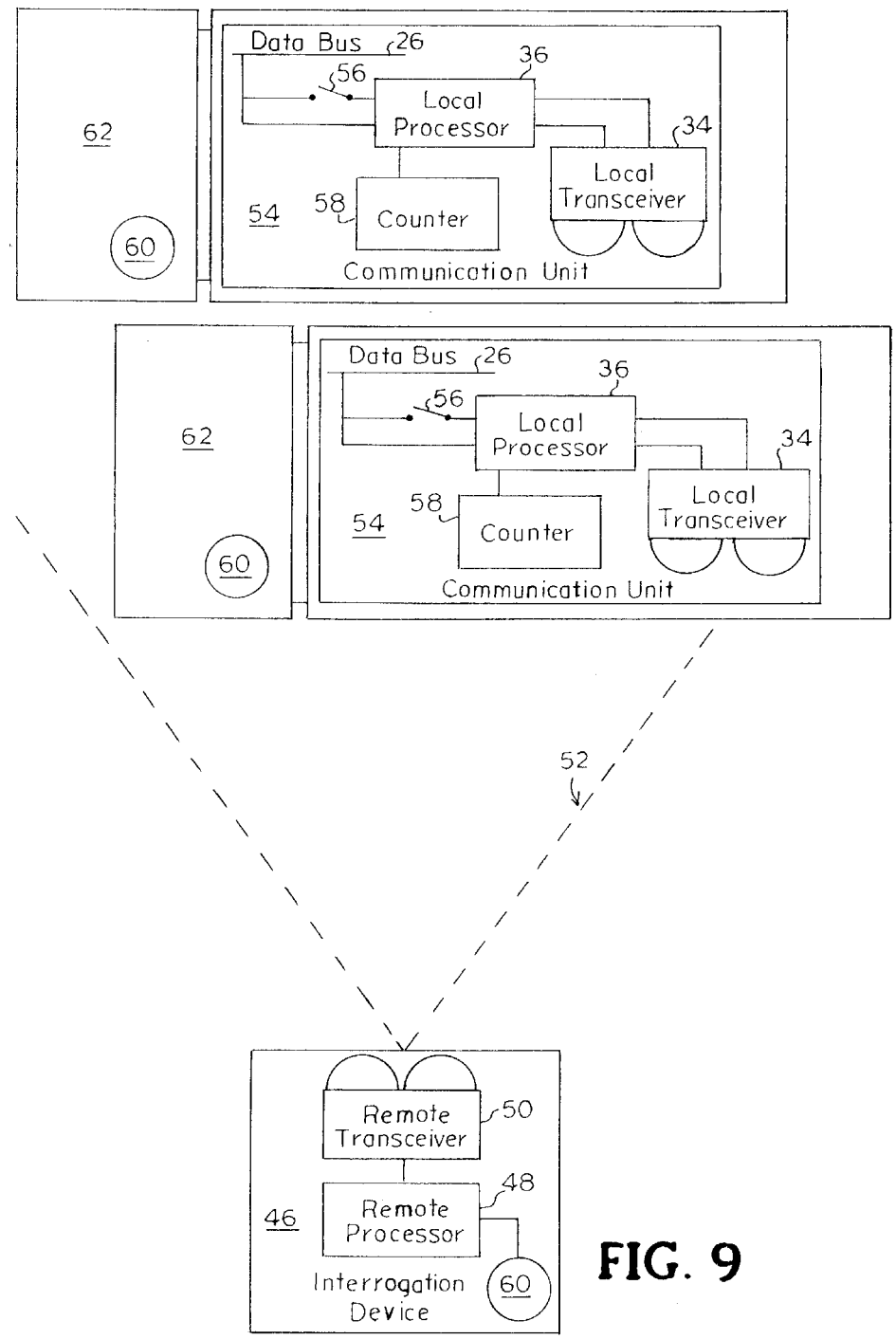
FIG. 9 is a block diagram of an apparatus for establishing a data link between a data bus of one of at least two vehicles and an interrogation device having a remote processor and a remote transceiver according to one embodiment of the present invention.

With reference to FIG. 9, an apparatus according to one embodiment for establishing a data communication link between a data bus of one of at least two vehicles and an interrogation device is illustrated. In this embodiment of the present invention, the interrogation device 46 includes a remote processor 48 and a remote transceiver 50. Additionally each of the vehicles, 62 and 64, includes a communication unit 54. Each of the communication units, in turn, includes a local transceiver 34 in operable electrical communication with the data bus 26 of the associated vehicle. The communication units also include a local processor 36 and a switch 56 in operable electrical communication with both the local transceiver and the data bus. Importantly, each of the communication units also includes a counter 58 in electrical communication with the local processor. Further, each of the vehicles has an associated individual data link threshold value that is typically different from the other vehicles.

As discussed, the apparatus of this embodiment can be used to determine with which vehicle the interrogation device should establish a data communication link. For example, in the instance illustrated in FIG. 8A, the apparatus of the present invention establishes a data communication link with one of the vehicles. Specifically, with reference to FIG. 10, to establish a data communication link, the remote processor of the interrogation device, initially transmits a periodic data link command. (See step 320). Each of the local processors of each of the vehicles monitors receipt of the periodic data link command, (see step 330), and the counter counts the number of times the data link command has been sent. (See step 350). Each of the local processors compares the number of times the data link command has been received to the individual data link threshold value associated with the vehicle. (See step 360). This process is continued until the number of times the data link command is received by one of the local processors equals the individual data link threshold value associated with the vehicle. (See step 370). At this point, the local processor associated with the vehicle closes the switch connecting the data bus to the local transceiver to thereby establish a data communication link between the data bus of the vehicle and the remote processor of the interrogation device. (See step 380).

As a data communication link is established with the interrogation device and one of the vehicles, it is advantageous to ensure that the other vehicle does not attempt to establish a data communication link with the remote interrogation device until the data communication link between interrogation device and the first vehicle is complete. To accomplish this, after the interrogation device has established a data communication link with the first vehicle, it ceases transmission of the periodic data link command. As the local processor of the vehicle with which the interrogation device is not currently linked, no longer receives the periodic data link command, the local processor of the vehicle will not attempt to establish a data communication link with the interrogation device.

As detailed above, each of the vehicles has an associated data link threshold value that is different from the other vehicles. Although it is possible to assign each of the vehicles to be interrogated an individual data link threshold value, in some cases, where there are a large number of vehicles, this may not be practical. For example, some trucking companies may have several hundred vehicles. In this instance, assigning a number to each vehicle may cause some vehicles to have such large data link threshold values that the vehicle may have to receive an impractical number of data link commands prior to establishing a data communication link with the interrogation device.

Figure 10A:
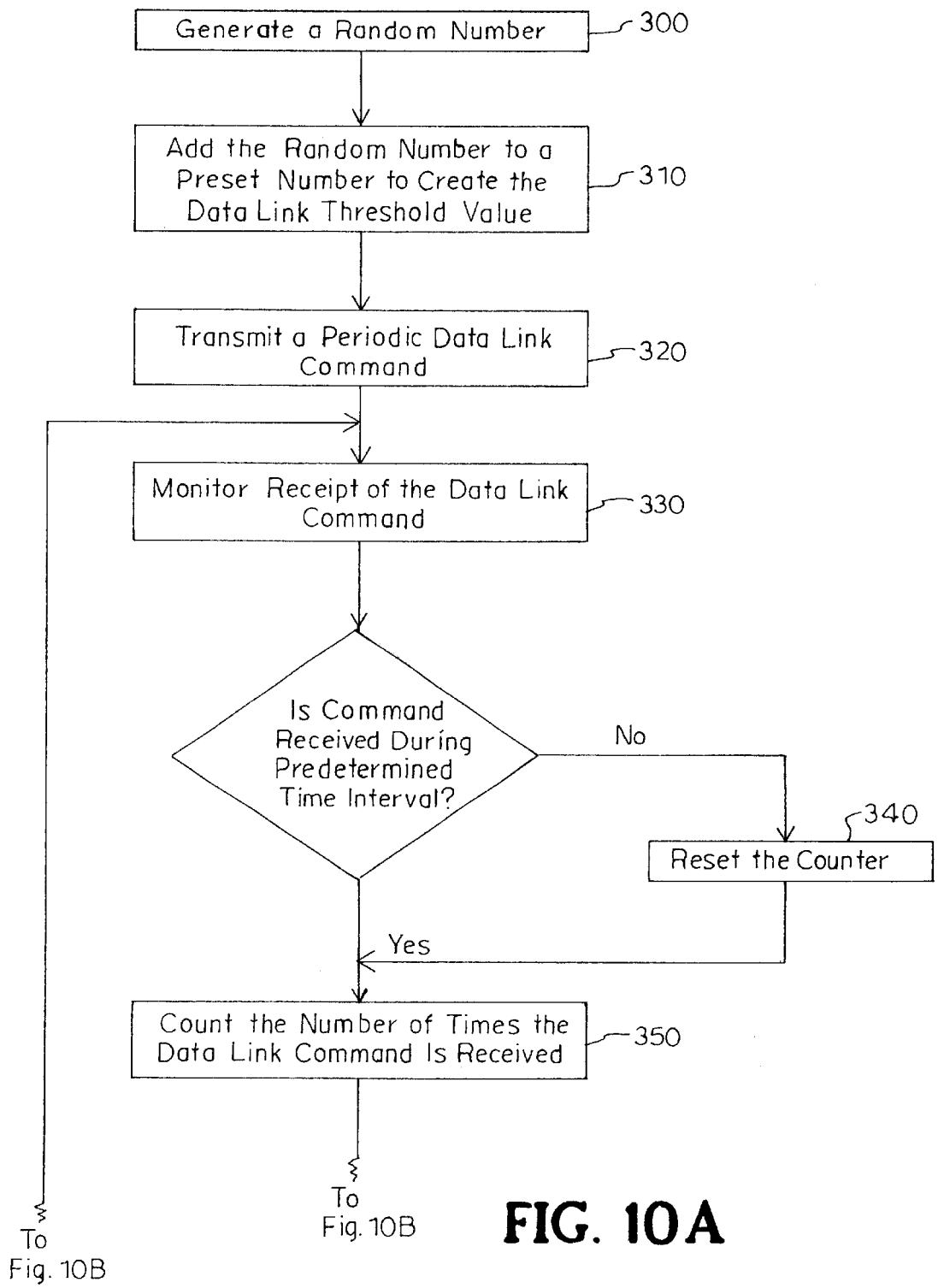
FIGS. 10A and 10B are a block diagram of the operations performed to establish a data link between a data bus of one of at least two vehicles and an interrogation device having a remote processor and a remote transceiver according to one embodiment of the present invention.
Figure 10B:
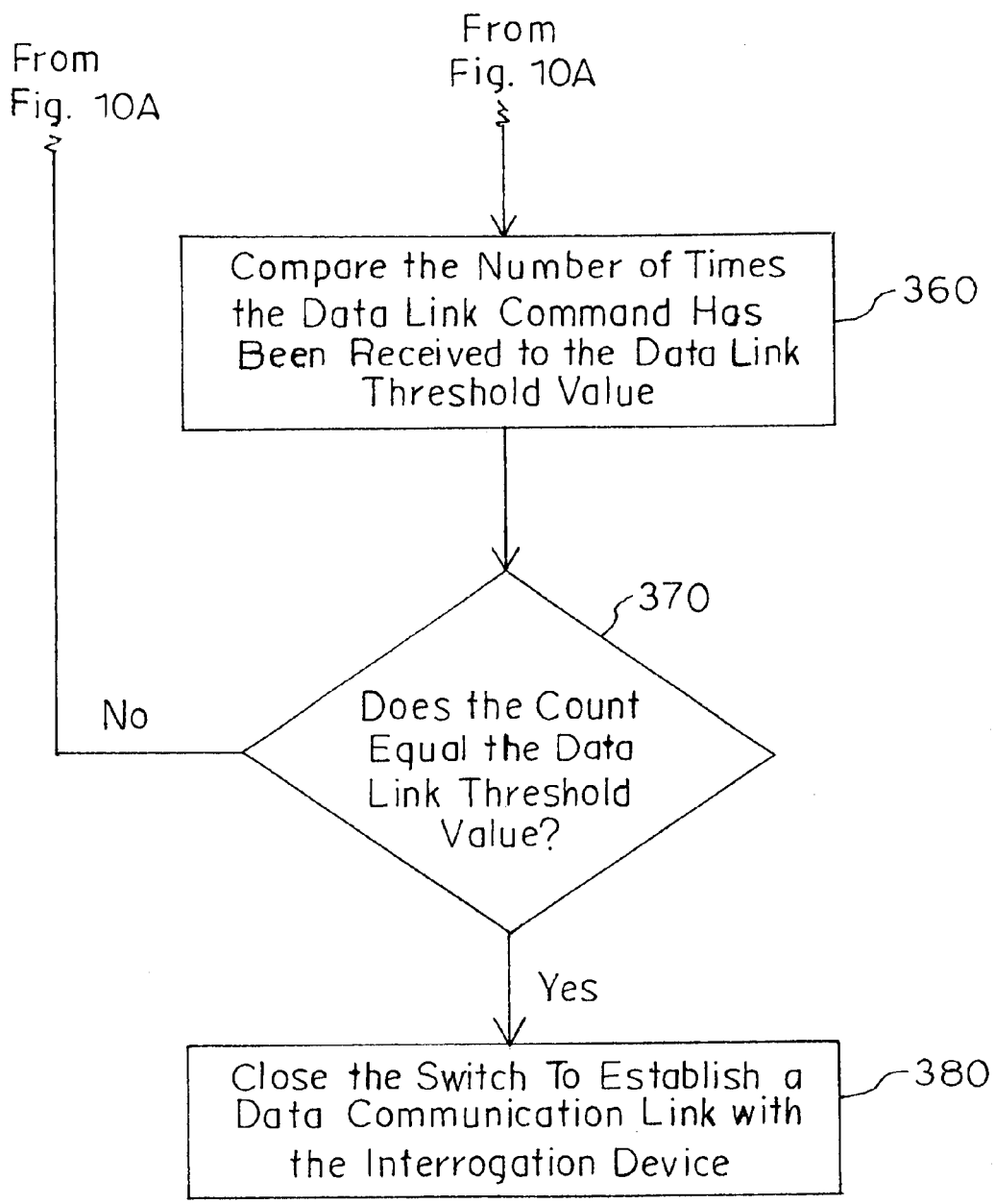

With reference to FIG. 9, to remedy this, in one embodiment of the present invention, the communication unit 54 associated with each vehicle further includes a random number generator 58 in electrical communication with each of the processors 36 and 48. With reference to FIG. 10, in this embodiment, the random number generators for each communication unit initially generate a random number. (See step 300). The local processor for each vehicle adds the random number to a preset number, that is typically the same for all of the vehicles, to create an individual data link threshold value. (See step 310). Similar to previous embodiments, the remote processor of the interrogation device, transmits a periodic data link command, (see step 320), and each of the local processors of each of the vehicles monitors receipt of the periodic data link command. (See step 330). The counter counts the number of times the data link command has been sent. (See step 350). Each of the local processors compare the number of times the data link command has been received to the individual data link threshold value associated with the vehicle. (See step 360). When the number of times that the data link command is received by one of the local processors equals the individual data link threshold value associated with the vehicle, (see step 370), the local processor associated with the vehicle closes the switch connecting the data bus to the local transceiver to thereby establish a data communication link between the data bus of the vehicle and the remote processor of the interrogation device. (See step 380).

As discussed previously, FIG. 8B illustrates an instance in which one vehicle 62 is located in the transmission and reception range of the interrogation device and another vehicle 64 is located on the fringe of the transmission and reception range of the interrogation device. In this instance, the vehicle 64 on the fringe of the transmission and reception range 52 of the interrogation device is more likely to receive either corrupted or intermittent data signals. As such, it may be advantageous for the interrogation device to establish a data communication link with the vehicle designated 62, as opposed to the vehicle 64 on the fringe of transmission and reception range of the interrogation device.

To increase the chances that the interrogation device will establish a data communication link with the vehicle designated 62, in one embodiment of the present invention, every time a data communication link is missed by the local processor of a vehicle, the local processor resets the associated counter. Thus, the counter begins counting the number of times the data communication link is received from zero. In this embodiment, the data communication link command must be received a consecutive number of times that is equal to the data link threshold value before the local processor associated with the vehicle will establish a data communication link with the interrogation device. As such, vehicles located on the fringe or outside of the transmission and reception range of the interrogation device, that may receive either a corrupted or intermittent data link commands, will be less likely to establish a data communication link with the interrogation device.

With reference to FIG. 10, in this embodiment, the random number generators for each communication unit initially generate a random number. (See step 300). The local processor for each vehicle adds the random number to a preset number to create an individual data link threshold value. (See step 310). The remote processor of the interrogation device, sequentially transmits a periodic data link command at a predetermined time interval between transmissions, (see step 320), and each of the local processors of each of the vehicles monitors receipt of the periodic data link command. (See step 330). If the current periodic data link command is not received within the predetermined time interval from last receipt of the data link command, the local processor resets the counter. (See step 340). However, if the data link command is received within the predetermined time interval, the counter increases the counts to indicate the number of times the data link command has been received consecutively. (See step 350). Each of the local processors compares the number of times the data link command has been received to the individual data link threshold value associated with the vehicle. (See step 360). When the number of times the data link command has been received by one of the local processors equals the individual data link threshold value associated with the vehicle, (see step 370), the local processor associated with the vehicle closes the switch connecting the data bus to the local transceiver to thereby establish a data communication link between the data bus of the vehicle and the remote processor of the interrogation device. (See step 380).

As detailed above in relation to this embodiment, the data communication link must be received by the local processor of the vehicle a consecutive number of times equal to the data link threshold value before the local processor will establish a data communication link. In light of this fact, in some embodiments, the data link threshold value for each vehicle, and in the case where a random number generator is used, the preset portion of the data link threshold value may be chosen to have a relatively large value. The value is chosen sufficiently large such that the vehicle 62 located within the transmission and reception range of the interrogation device is more likely to receive the data communication link more consecutive times and thereby exceed the individual data link threshold value sooner than the vehicle 64 located on the fringe. Specifically, because the vehicle 64 on the fringe receives the signal intermittently, it will continue to reset the counter each time a data link command is missed and the counter will more likely not reach a count that equals the individual data link threshold value. This result may also be accomplished by evaluating the number of errors received by the local processors for each vehicle.

With reference to FIG. 8C, the present invention also provides apparatus and methods that prevent the interrogation device from establishing a data communication link with a second vehicle 64 that has entered the transmission and reception range of the interrogation device while the interrogation device has established in a data communication link 66 with a first vehicle 62. Specifically, as discussed previously, after the interrogation device has established a data communication link with one vehicle, it ceases transmission of the data link command until the data communication link with the vehicle has ended. As such, in situations where a second vehicle 64 enters the transmission and reception range of the interrogation device, the second vehicle will not receive the data link command and will not attempt to establish a data communication link with the interrogation device.

As detailed above, the interrogation device typically has a limited transmission and reception range, outside of which the data signal may be corrupted, intermittent, or non-existent. It must be understood that the transmission and receiving range of the interrogation device may also be manipulated to either narrow or expand to some extent the transmission and reception range of the interrogation device. For instance, in a setting where several vehicles are located close together, the transmission and reception range of the interrogation device may be physically narrowed, such that the interrogation device may be focused on a particular vehicle of interest.

In addition, the remote interrogation device may focus the system to communicate with one particular vehicle or a group of vehicles by commanding vehicles in which the interrogation device is not interested to remain idle. In this embodiment of the present invention, the interrogation device may transmit an idle command that includes a list of vehicle identification numbers. Vehicles having one of these identification numbers will receive the command and not attempt to establish a data communication link with the interrogation device. Similarly, the interrogation device may transmit a command that includes a list of vehicle identification numbers that the interrogation device wishes to establish data communication. In this instance, only vehicles having corresponding identification numbers will attempt to establish a data communication link with the interrogation device.

Due to the limited transmission and reception range of the interrogation device, in some embodiments, it is advantageous to provide an indication to the driver of the vehicle or to the user of the interrogation device when the vehicle is within the transmission and reception range of the interrogation device. Specifically, with reference to FIG. 9, either the interrogation device or each communication unit may further include an indicator 60 in electrical communication with either the local or remote processor to indicate when the vehicle is in the transmission and reception range 52 of the interrogation device. Specifically, in instances in which the indicator is connected to the local processor of the communication unit, when a data link has been established with the remote processor of the interrogation device, the local processor may control the indicator to indicate to a user that a data communication link has been established. In another embodiment, the local processor may control the indicator to indicate to a user each time the local processor receives the data communication link command from the remote processor of the interrogation device. In this embodiment, the user of the vehicle can determine based on the period between indications, whether the vehicle is inside the transmission and reception range of the interrogation device.

In addition to providing apparatus and methods that process data bit by bit, prevent the propagation of false data, and establish data communication links, the present invention also provides apparatus and methods that either store data concerning the vehicle for later transmission or store data for later transmission to either one or several vehicles. These embodiments may also allow for high speed data transmission to either the vehicle or remote interrogation device.

Specifically, with reference to FIG. 11, an apparatus for storing data related to a vehicle for later transmittal is shown. In this embodiment of the present invention, the apparatus 66 includes a local transceiver 34 that is in operable electrical communication with the data bus 26 of the vehicle shown in FIG. 2. Connected to both the data bus and the transceiver is a local processor 36. Additionally, a local memory device 68 is in electrical communication with the local processor. In this embodiment of the present invention, during operation of the vehicle, the local processor receives data concerning systems of interest of both the vehicle and possibly the vehicle's cargo. This data is stored in the local memory device as historical data concerning the vehicle. This data may either be analyzed by the local processor or transmitted to a remote interrogation device during a later data transfer mode. As such, historical data concerning the vehicle and its contents may be recorded for analysis. This historical data may include such parameters as the average speed of the vehicle, accelerations, number of times the vehicle had abrupt stops, brake temperatures, temperature data of the trailer, data relating to the cargo, etc.

Figure 11:
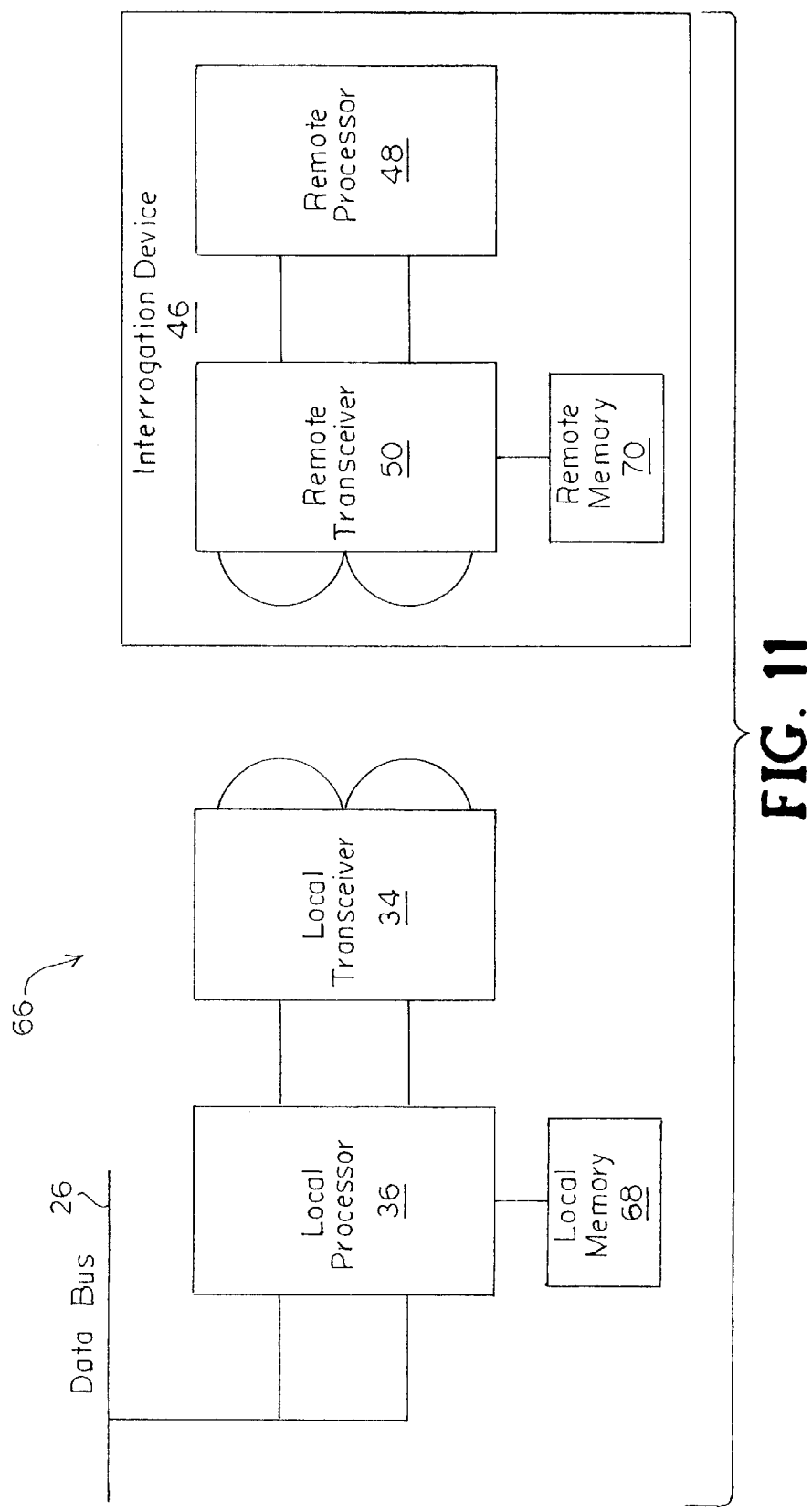
FIG. 11 is a block diagram of an apparatus for storing data concerning the operation of a vehicle and/or data to be transmitted to a vehicle according to one embodiment of the present invention.

With reference to FIG. 11, the apparatus 66 of this embodiment may also include a remote memory device located in the remote interrogation device for storing data to be transmitted to either one or several vehicles. Specifically, in this embodiment of the present invention, the remote interrogation device 46 includes a remote processor 48 and a remote transceiver 50. Additionally, the remote interrogation device includes a remote memory device 70 in electrical communication with the remote processor. In this embodiment of the present invention, the remote memory device may include data related to either one vehicle, a group of vehicles, or all of the vehicles in a fleet. In this embodiment, when the interrogation device forms a data communication link with a vehicle designated to receive the data, the remote processor accesses the data and transmits it to the vehicle.

In addition to storing data for later transmission, the local and remote memory devices may also be used to transmit data either to or from the vehicle at high data speeds. This is advantageous where there is only a limited time for data transmission, such as where the vehicle is moving past the interrogation device. In this embodiment of the present invention, data concerning the vehicle may be store in the local memory device and during data transmission, the local processor may transmit the data at data speeds exceeding the speed of the data bus. The transmitted data is received by the remote interrogation device and stored in the remote memory device until it can be processed. Similarly, data for transmission to a vehicle may be stored in the remote memory device, and when a data communication link is established, transmitted to the local processor of the vehicle at data rates exceeding the data bus of the vehicle. The data is stored in the local processor until it can be applied to the data bus. As such, data can be transmitted in instances where the time for a data communication link is restrictive.

As detailed above, the present invention includes transceivers for transmission of data to and from a remote location from the data bus of the vehicle. It must be understood that the present invention may use any form of data communication to transmit the data. For instance, in one embodiment, the transceivers may be IR transceivers, while in another embodiment the transceivers may be either fiber optic or RF. Additionally, it must be understood that many different types of data protocol may be used. For example, in the case of IR, infrared data association protocol (IrDA) may be used. In case of RF, the data may be transmitted by any form of RF modulation including Frequency Shift Keyed (FSK), Pulse Width Modulation (PWM), etc.

In addition, the present invention may be adapted to use newly developed protocol and data communication systems. Specifically, the present invention is designed to interface with emerging technologies such as BLUETOOTH™. BLUETOOTH™ is an open specification for wireless communication of data and voice. It is based on a low-cost short-range radio link built into a microchip. Currently, the BLUETOOTH™ specification is being considered for use as a new global wide specification for wireless communication. More information concerning the BLUETOOTH™ specification is available via the internet at the following website: http://www.bluetooth.com/default.asp.

The present invention may also include embodiments that communicate with the computer system of a vehicle via a universal serial bus (USB). A USB bus is a newly developed data bus that is currently being implemented with many new communication and computer systems. Specifically, many systems that traditionally implemented RS 232 serial data buses are now using USB data buses. In one embodiment of the present invention, the local processor of the vehicle may further include a connection to the USB data bus of the vehicle. In this embodiment of the present invention, the local processor may either receive data from or transmit data to the computer and subsystems of the vehicle via the USB bus. Data received from the USB data bus for transmission to a remote location, is received by the local processor and transmitted via the local transceiver as either RF or IR signals to a remote interrogation device.

As discussed above, the present invention uses an interrogation device to communicate with the data bus of the vehicle. It must be understood that the interrogation device may be many different type devices. For instance, the interrogation device may be a specifically designed unit or the interrogation device may be a communication device such as a cellular phone, pager, palm pilot, laptop, etc. that interfaces with the data bus and transmits the data similar to a modem to a remote location for data processing. The use of a cell phone, pager, palm pilot is useful, as it may allow the user to download information such as diagnostics concerning the vehicle roadside if the vehicle has system failures. For instance, if the vehicle malfunctions, the user may download data to a cell phone that is transmitted to a maintenance station, and the maintenance station may be able to transmit data back to the vehicle via the cell phone to repair the vehicle remotely.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for establishing a data communication link between a data bus of a vehicle and a remote interrogation device where unwanted signals may be received by the data bus and corrupt data on the data bus, wherein said apparatus comprises:

a local transceiver in operable electrical communication with the data bus for transmitting data to and data from the data bus;

a local processor in operable electrical communication with both said transceiver and the data bus; and a switch in operable electrical communication with said local processor, local transceiver, and the data bus, wherein said switch in a closed position connects said local transceiver and the data bus and in an open position isolates said local transceiver from the data bus, and wherein said local processor in a data transfer mode closes said switch and in an idle mode opens said switch such that in the idle mode unwanted signals received by said local transceiver are not input to the data bus.

2. An apparatus according to claim 1 further comprising a remote interrogation device having a transceiver in electrical communication with a remote processor for transmitting data to and receiving data from the data bus of the vehicle.

3. An apparatus according to claim 2, wherein in a data transfer mode, said remote processor of said interrogation device controls said remote transceiver to transmit a data link command to said local processor, and wherein upon receipt of the data link command, said local processor closes said switch to thereby establish a data link between the data bus and said remote processor.

4. An apparatus according to claim 3, wherein in a data transfer mode, said remote processor of said interrogation device controls said remote transceiver to sequentially transmit a plurality of data link commands to said local processor, wherein said apparatus further comprises a counter in electrical communication with said local processor, wherein said counter counts the number of times the data link command is received by said local processor, and wherein said local processor closes said switch when the number of times the data link command was received exceeds a predetermined threshold value to thereby create a data link between said remote processor and the data bus of the vehicle.

5. An apparatus according to claim 4, wherein said interrogation device controls said remote transceiver to sequentially transmit a data link command at a predetermined time intervals to said local processor, wherein said counter counts the number of times the data link command is received by said local processor, wherein said local processor monitors the time interval between receipt of each data link command, and wherein said local processor resets said counter if the data link command is not received within the predetermined time interval, such that the counter totals the number of times the data link command was transmitted consecutively.

6. An apparatus according to claim 3, wherein when transmitting data to the data bus in a data transfer mode, said remote processor periodically transmits a heartbeat signal indicating an established data link between said remote processor and the data bus, and wherein said local processor monitors an interval between receipt of the periodic heartbeat signal, and if the heartbeat signal is not received within a predetermined time interval, said local processor determines that that the data link is no longer viable and opens the switch thereby isolating the data bus from said local transceiver to alleviate the introduction of noise into the data bus.

7. An apparatus according to claim 3, wherein when data is transmitted to the data bus in a data transfer mode, said local processor monitors the data for errors and determines that that the data link is no longer viable when a predetermined percentage of the data received is in error, and wherein said local processor opens the switch thereby isolating the data bus from the local transceiver to alleviate the introduction of noise onto the data bus.

8. An apparatus according to claim 3, wherein when in the data transfer mode, said local processor periodically transmits a heartbeat signal indicating an established data link between said remote processor and the data bus, and wherein said remote processor monitors an interval between receipt of the periodic heartbeat signal, and if the heartbeat signal is not received within a predetermined time interval, said remote processor determines that that the data link is no longer viable and ceases transmitting data to said local transceiver.

9. A method for establishing a data communication link between a data bus of a vehicle having a transceiver for receiving data and a remote interrogation device where unwanted signals may be received by the data bus and corrupt data on the data bus, wherein said method comprises the steps of:

connecting the local transceiver and the data bus in a data transfer mode such that the data bus may receive data transmitted by the remote interrogation device;

in the data transfer mode, sequentially transmitting a plurality of data link commands to the data bus of the vehicle, wherein said connecting step comprises the steps of:

receiving the data link commands;

counting the number of times the data link command is received;

comparing the number of times the data link command is received to a predetermined threshold; and connecting the data bus to the local transceiver when the number of times the data link command has been received exceeds the predetermined threshold; and isolating the local transceiver from the data bus in an idle mode such that unwanted signals received by the transceiver are not input to the data bus.

10. A method according to claim 9, wherein in the data transfer mode said transmitting step comprises sequentially transmitting a data link command at a predetermined time interval to the data bus, wherein said counting step comprises counting the number of times the data link command is received, wherein said method further comprises the step of monitoring the time interval between receipt of each data link command and resetting said counting step if the data link command is not received within the predetermined time interval, such that said counting step totals the number of times the data link command was transmitted without interruption.

11. A method according to claim 9, wherein in the data transfer mode after said connecting step said method further comprises the steps of:

periodically transmitting a heartbeat signal from the remote processor to the data bus indicating an established data link between the remote processor and the data bus; and monitoring an interval between receipt of the periodic heartbeat signals, wherein said isolating step comprises isolating the data bus from the local transceiver to alleviate the introduction of noise onto the data bus if the heartbeat signal is not received within a predetermined time interval indicating that the data link is no longer viable.

12. A method according to claim 9, wherein said monitoring step comprises monitoring data transmitted to the data bus for errors, and wherein said isolating step comprises isolating the data bus from the local transceiver when a predetermined percentage of the data received is in error to thereby alleviate the introduction of noise onto the data bus.

13. A method for establishing a data communication link between a data bus of a vehicle having a transceiver for receiving data and a remote interrogation device where unwanted signals may be received by the data bus and corrupt data on the data bus, wherein said method comprises the steps of:

connecting the local transceiver and the data bus in a data transfer mode such that the data bus may receive data transmitted by the remote interrogation device;

in the data transfer mode, initially transmitting a data link command to the data bus of the vehicle, wherein said connecting step comprises receiving the data link command and connecting the local transceiver and the data bus to thereby establish a data link between the data bus and the remote interrogation device;

periodically transmitting a heartbeat signal from the local transceiver to the remote interrogation device indicating an established data link between the remote interrogation device and the data bus;

monitoring an interval between receipt of the periodic heartbeat signal;

ceasing transmission of data from the remote interrogation device to the data bus if the heartbeat signal is not received within a predetermined time interval indicating that the data link is no longer viable; and isolating the local transceiver from the data bus in an idle mode such that unwanted signals received by the transceiver are not input to the data bus.

14. An apparatus for establishing a data link between a data bus of one of at least two vehicles and an interrogation device having a remote processor and a remote transceiver, wherein said apparatus comprises:

a communication unit located on each of the vehicles, wherein each communication unit comprises:

a local transceiver in operable electrical communication with the data bus of the associated vehicle for transmitting data to and transmitting data from the data bus; and a local processor in operable electrical communication with both said transceiver and the data bus;

wherein the remote processor of the interrogation device controls the remote transceiver to transmit a periodic data link command to said local processor of each of said communication units, wherein each of said local processors of each of said communication units receives the periodic data link command and compares the number of times the data link command has been received to a individual data link threshold value that differs for each vehicle, and wherein when the number of times the data link command is received is at least or great as the individual data link threshold value associated with one of the vehicles, said local processor of said communication unit associated with the vehicle forms a data link between the data bus of the vehicle and the remote processor of said interrogation device such that a data link is formed between said interrogation device and the data bus of one of the vehicles.

15. An apparatus according to claim 14, wherein each of said communication units further comprises a random number generator in electrical communication with said local processor, wherein the data link threshold value associated with each vehicle is defined by a preset number and a number generated by the random number generator associated with each vehicle, wherein the random number generator associated with each vehicle generates a random number that is added to the preset number to create an individual data link threshold value for each vehicle, wherein each of said local processors of each of said communication units receives the periodic data link command and compares the number of times the data link command has been received to the individual data link threshold value associated with the vehicle, and wherein when the number of times the data link command is received is at least or great as the individual data link threshold value associated with the vehicle, said local processor of said communication unit associated with the vehicle forms a data link between the data bus of the vehicle and the remote processor.

16. An apparatus according to claim 15, wherein the remote transceiver has a limited horizontal data transmission and reception range such that vehicles outside the transmission and reception range may receive intermittent data signals from the interrogation device.

17. An apparatus according to claim 16, wherein the remote processor of the interrogation device controls the remote transceiver to transmit a periodic data link command, wherein each data link command is transmitted at a predetermined time interval, wherein if said local processor of one of said communication units does not receive the data link command within the predetermined time interval, said local processor resets the number of times the data link command has been received, such that said local processor must receive a consecutive number of data link commands that is at least as great as the data link threshold value before forming a data link between the bus of the vehicle and the remote processor.

18. An apparatus according to claim 17, wherein the preset number portion of the individual data link threshold value for each vehicle has a selected value that is sufficiently large such that vehicles located outside the horizontal data transmission and reception range of the remote transceiver of the interrogation device that may intermittently receive the periodic data link command transmitted by the remote processor are less likely to receive the data link command consecutively enough times to exceed the individual data link threshold value associated with the vehicle than vehicles located within the transmission and reception range of the interrogation device.

19. An apparatus according to claim 16, wherein said communication unit further comprises an indicator in electrical communication with said local processor, wherein each time the local processor receives the data communication link command from the remote processor of said interrogation device, said local processor controls the indicator to indicate to a user, such that as the vehicle enters the transmission and reception range of the remote transceiver, the indicator will indicate to the user that the vehicle is in the transmission and reception range.

20. An apparatus according to claim 14, wherein the remote processor of the interrogation device ceases transmission of the data link command when a data link is formed between the data bus of one of the vehicles and the remote processor of the interrogation device, such that the communication unit of another vehicle does not attempt to establish a data link with the remote processor.

21. An apparatus according to claim 14, wherein said communication unit further comprises an indicator in electrical communication with said local processor, wherein when a data link has been established with the remote processor of the interrogation device, said local processor controls said indicator to indicate to a user that a data link has been established.

22. An apparatus according to claim 14, wherein said communication unit further comprises a switch in operable electrical communication with said local processor, said local transceiver, and the data bus of the vehicle, wherein said switch in a closed position connects said local transceiver and the data bus and in an open position isolates said local transceiver from the data bus, and wherein said local processor in a data transfer mode closes said switch and in an idle mode opens said switch such that in the idle mode unwanted signals received by said local transceiver are not input onto the data bus.

23. A method for establishing a data link between a data bus of one of at least two vehicles and an interrogation device having a remote processor and a remote transceiver, wherein said method comprises the steps of:

periodically transmitting a data link command to an individual processor associated with each data bus of each vehicle;

receiving the periodic data link command at the processor associated with each data bus;

comparing the number of times the data link command has been received by the associated processor to an individual data link threshold value associated with each vehicle; and forming a data link between the interrogation device and the data bus of a vehicle having an associated data link threshold value that is at least or great as the number of times the data link command was received by the processor associated with the vehicle such that a data link is formed between the interrogation device and the data bus of one of the vehicles.

24. A method according to claim 23, wherein the data link threshold value associated with each vehicle is defined by a preset number and a random number, wherein said method further comprises the steps of:

individually generating a random number for each of the vehicles; and adding the random number to the preset number to create an individual data link threshold value for each vehicle.

25. A method according to claim 23 further comprising after said forming step the step of ceasing the transmission of the data link command when said forming step forms a data link between the data bus of one of the vehicles and the remote processor of the interrogation device, such that another vehicle does not establish a data link with the remote processor.

26. A method according to claim 23, wherein the remote transceiver of the interrogation device has a limited horizontal data transmission and reception range such that vehicles outside the transmission and reception range may receive intermittent data signals from the interrogation device.

27. A method according to claim 26, wherein said transmitting step comprises transmitting a periodic data link command, wherein each data link command is transmitted at a predetermined time interval, wherein if said local processor of one of said communication units does not receive the data link command within the predetermined time interval, said method further comprises the step of resetting said counting step, such that the local processor must receive a consecutive number of data link commands that is at least or great as the data link threshold value before said forming step forms a data link between the data bus of the vehicle and the remote processor.

28. A method according to claim 27 further comprising the step of selecting a preset number portion of the individual data link threshold value for each vehicle such that the data link threshold value associated with each vehicle is sufficiently large such that vehicles located outside the horizontal data transmission and reception range of the remote transceiver of the interrogation device that may intermittently receive the periodic data link command are less likely to receive the data link command enough consecutive times to exceed the individual data link threshold value associated with the vehicle than vehicles located within the transmission and reception range of the interrogation device.

29. A method according to claim 23 further comprising the step of indicating to a user of the vehicle when said forming step forms a data link with the remote processor of the interrogation device and the data bus of the vehicle.

30. A method according to claim 23 further comprising the step of indicating to a user of the vehicle each time said receiving step receives the data communication link command, such that as the vehicle enters the transmission and reception range of the remote transceiver, said indicating step indicates to the user of the vehicle that the vehicle is in the transmission and reception range.

* * * * *